(12) United States Patent
Wakai

(10) Patent No.: US 7,865,580 B2
(45) Date of Patent: Jan. 4, 2011

(54) INFORMATION PROCESSING APPARATUS AND GROUPING METHOD

(75) Inventor: Masanori Wakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 11/499,743

(22) Filed: Aug. 7, 2006

(65) Prior Publication Data

US 2007/0041381 A1 Feb. 22, 2007

(30) Foreign Application Priority Data

Aug. 22, 2005 (JP) .............................. 2005-240198

(51) Int. Cl.
*G06F 15/177* (2006.01)
(52) U.S. Cl. ...................... 709/221; 709/220
(58) Field of Classification Search ................ 709/201, 709/202, 203, 217, 218, 220, 221, 222, 224, 709/225, 227

See application file for complete search history.

(56) References Cited

U.S. PATENT DOCUMENTS

| | | | |
|---|---|---|---|
| 5,563,886 A * | 10/1996 | Kawamura et al. .......... 370/257 |
| 6,157,465 A | 12/2000 | Suda et al. |
| 6,477,570 B1 | 11/2002 | Takayama et al. |
| 6,587,835 B1 * | 7/2003 | Treyz et al. .............. 705/14.64 |
| 6,625,735 B2 | 9/2003 | Jeyachandran et al. |
| 6,697,165 B2 | 2/2004 | Wakai et al. |
| 7,209,246 B2 | 4/2007 | Suda et al. |
| 7,403,980 B2 * | 7/2008 | Stringer-Calvert et al. .. 709/220 |
| 7,599,859 B2 * | 10/2009 | Fulton et al. ................... 705/26 |
| 2002/0083337 A1 * | 6/2002 | Welcher et al. ............. 713/201 |
| 2002/0114286 A1 * | 8/2002 | Iwamura et al. ............. 370/252 |
| 2003/0012219 A1 * | 1/2003 | Joo ............................. 370/449 |
| 2003/0084291 A1 * | 5/2003 | Yamamoto et al. .......... 713/168 |
| 2006/0085839 A1 * | 4/2006 | Brandt et al. ................... 726/2 |
| 2007/0041056 A1 | 2/2007 | Wakai et al. |

FOREIGN PATENT DOCUMENTS

| JP | 2001-036638 | 9/2001 |
|---|---|---|
| JP | 2003-188788 | 4/2003 |

* cited by examiner

*Primary Examiner*—Barbara N Burgess
(74) *Attorney, Agent, or Firm*—Fitzpatrick, Cella, Harper & Scinto

(57) ABSTRACT

In an information processing apparatus for identifying a plurality of communication devices, grouping and managing the identified communication devices, communication devices that are in a state of communication among devices forbidden are grouped and managed. Then, it acts for obtaining data of another communication device when the data is obtained among the communication devices grouped. The data obtaining proxy is performed when a request to obtain data of another communication device is received from a communication device, and data of another communication device is obtained based on the request, and it is sent to a communication device.

13 Claims, 39 Drawing Sheets

FIG. 15

GROUP MANAGEMENT DATA

| GROUP NAME | CONFIGURATION ID | PAUSING CONFIGURATION ID |
|---|---|---|
| SALES DEPARTMENT III | 003, 102, 201, 202, 307 | 201, 202 |
| NEW 001 | 102, 105, 107 | |
| NEW 002 | 102, 123, 125 | |
| ... | ... | ... |

SYNCHRONIZATION MANAGEMENT DATA

| Path | CONFIGURATION ID | SYNCHRONIZATION | OBJECT | CACHE |
|------|------------------|-----------------|-----------|-------|
| A    | 102              | DO              | THUMBNAIL | DO    |
| B    | 105              | DO              | ALL       | DO    |
| C    | 107              | NOT DO          |           | DO    |
| ...  | ...              | ...             | ...       | ...   |

DATA IDENTIFYING INFORMATION MANAGEMENT DATA

| THUMBNAIL Path | CONFIGURATION ID | ORIGINAL DATA 2901 | |
| --- | --- | --- | --- |
| | | DATA ID | |
| A¥IMG_0021.thm | 102 | IMG_0021.jpg | |
| A¥MOV_0022.thm | 102 | MOV_0022.mpg | |
| B¥TXT_0123.thm | 105 | TXT_0123.txt | |
| ... | ... | ... | |

F I G. 31

TEMPORARILY SAVED DATA

| CONFIGURATION ID | DATA ID | UPDATED DATE AND TIME | SIZE 3101 |
|---|---|---|---|
| 102 | IMG_0021.jpg | 2005/02/23 12:15:32:22 | 123456 |
| 102 | MOV_0022.mpg | 2005/03/02 10:33:00:11 | 343232 |
| 105 | TXT_0123.txt | 2005/05/11 08:59:22:00 | 213 |
| ... | ... | ... | ... |

FIG. 34

SYNCHRONIZATION MANAGEMENT DATA

| Path | CONFIGURATION ID | SYNCHRONIZATION | DIRECTION |
|---|---|---|---|
| ¥SYNCHRONIZATION FOLDER¥B | 105 | DO | ONLY OBTAINMENT |
| ¥SYNCHRONIZATION FOLDER¥C | 107 | DO | BOTH DIRECTIONS |
| ... | ... | ... | ... |

3401 — SYNCHRONIZATION
3402 — DIRECTION

F I G. 37
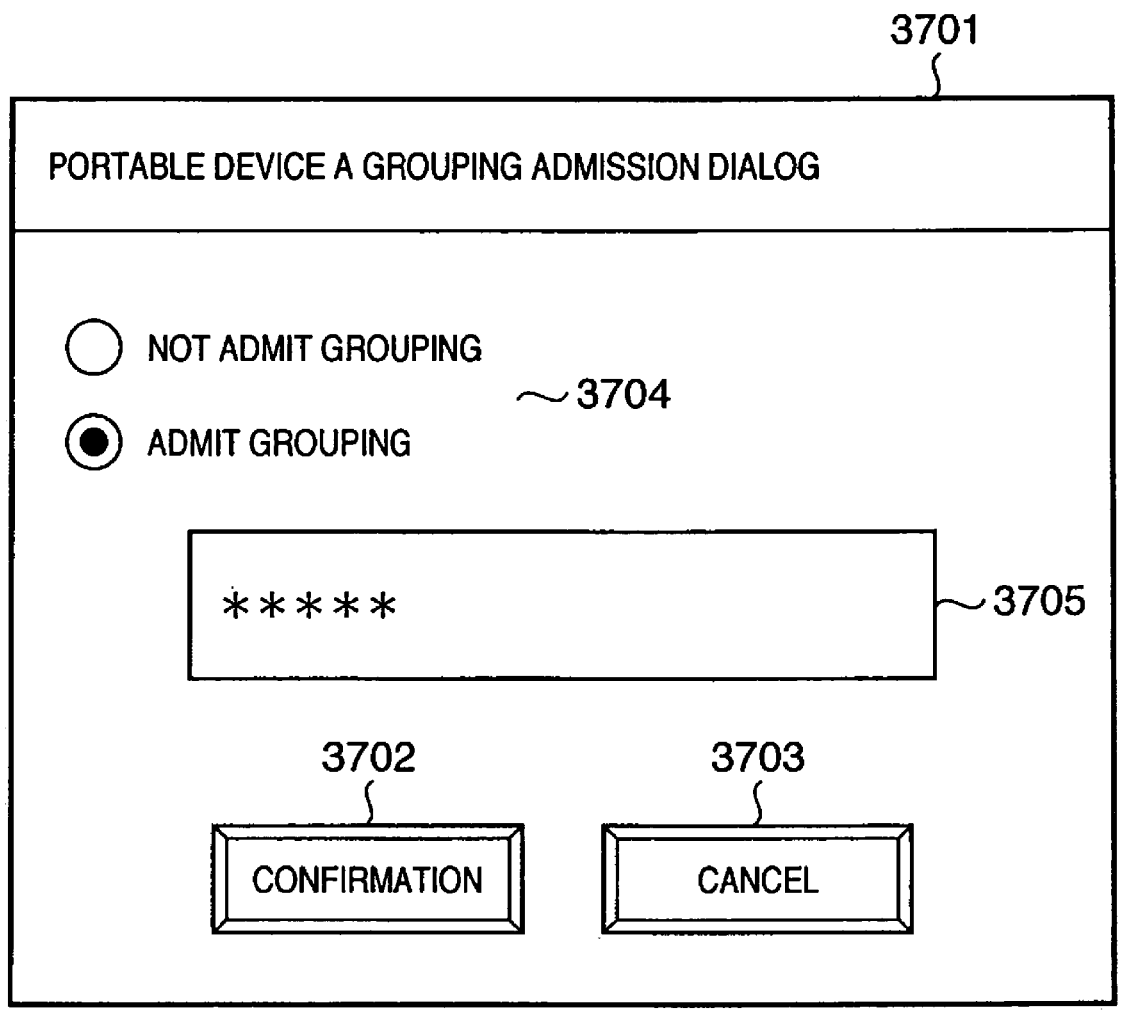

1

INFORMATION PROCESSING APPARATUS AND GROUPING METHOD

BACKGROUND OF THE INVENTION

1. Field of the Invention

The present invention relates to a technique of identifying a plurality of communication devices, grouping and managing the identified communication devices.

2. Description of the Related Art

In recent years, as wireless LAN such as IEEE 802.11x has been widespread, any trouble in connecting, setting or the like of cables has been eliminated and data communication among a plurality of devices has been realized. In the data communication, a technique of rejecting an access from outside the groups within an effective area and avoiding troubles in an "authentication" procedure for securely exchanging data among the groups (for example, see prior art references 1 and 2) is proposed.

The technique described in the prior art reference 1 is for enabling wireless communication settings of all the appliances forming a group to be collectively designated. In conjunction with operation on just a single appliance, a communication setting for the other devices can be done, and the devices can be grouped.

The technique described in the prior art reference 2 can perform grouping by causing a memory card including wireless communication setting information to be read in each appliance in the group.

The prior art references 1, 2 are documents below.

Prior art reference 1: Japanese Patent Application Laid-Open No. 2001-036638

Prior art reference 2: Japanese Patent Application Laid-Open No. 2003-188788

In the prior art reference 1, however, a communication setting of the other devices needs to be directly rewritten, thus, all the objective devices need to have a system for that purpose. In the prior art reference 2, all the devices in the group need to read in a memory card, which makes operation troublesome.

In the prior art references 1 and 2, all the objective devices need to be placed in a settable state, when the settings are to be changed. If an objective device is to communicate with a non-objective device, the objective device needs to be independently set again. Further, a device cannot belong to a plurality of groups at the same time.

SUMMARY OF THE INVENTION

The present invention is adapted in view of the abovementioned problems, and intends to collectively designate a group of devices which can exchange data without changing the settings of a plurality of devices. It also intends to make it available even if all the objective devices have not a system for that purpose.

It also intends to enable a setting of each device to be changed whatever the state of each device is. It also intends that each device independently keeps communication with a non-objective device whatever the grouping designation is. Further, it intends to allow a device to belong to a plurality of groups at the same time.

In order to achieve the abovementioned objects, according to an aspect of the present invention, an information processing apparatus for identifying a plurality of communication devices, grouping and managing the identified communication devices, comprising: grouping means for grouping and managing communication devices that are in a state of communication among devices forbidden; and data obtaining proxy means for acting for obtaining data of another communication device when the data is obtained among the communication devices grouped by the grouping means, is provided.

Also, according to an aspect of the present invention, a grouping method of an information processing apparatus for identifying a plurality of communication devices, grouping and managing the identified communication devices, comprising: a grouping step of grouping and managing communication devices that are in a state of communication among devices forbidden; and a data obtaining proxy step of acting for obtaining data of another communication device when the data is obtained among communication devices grouped at the grouping step, is provided.

Further features of the present invention will become apparent from the following description of exemplary embodiments (with reference to the attached drawings).

BRIEF DESCRIPTION OF THE DRAWINGS

FIG. 15 is a diagram showing an example of group management data created by the grouping operation screen;

FIG. 26 is a diagram showing an example of synchronization management data created by the synchronization specifying operation screen;

FIG. 29 is a diagram showing an example of data identifying information management data for managing a correlation between data identifying information and original data which is used in accessing data in another device;

FIG. 31 is a diagram showing an example of temporally saved data that temporally records previously obtained data via an arbitration device in the fifth embodiment;

FIG. 34 is a diagram showing an example of synchronization management data in a portable device B;

FIG. 37 is a diagram showing an example of a portable device A grouping admission screen displayed on the operation screen of the portable device;

DESCRIPTION OF THE EMBODIMENTS

The preferred embodiments to implement the present invention will be described in detail with reference to the drawings.

Figure 1:
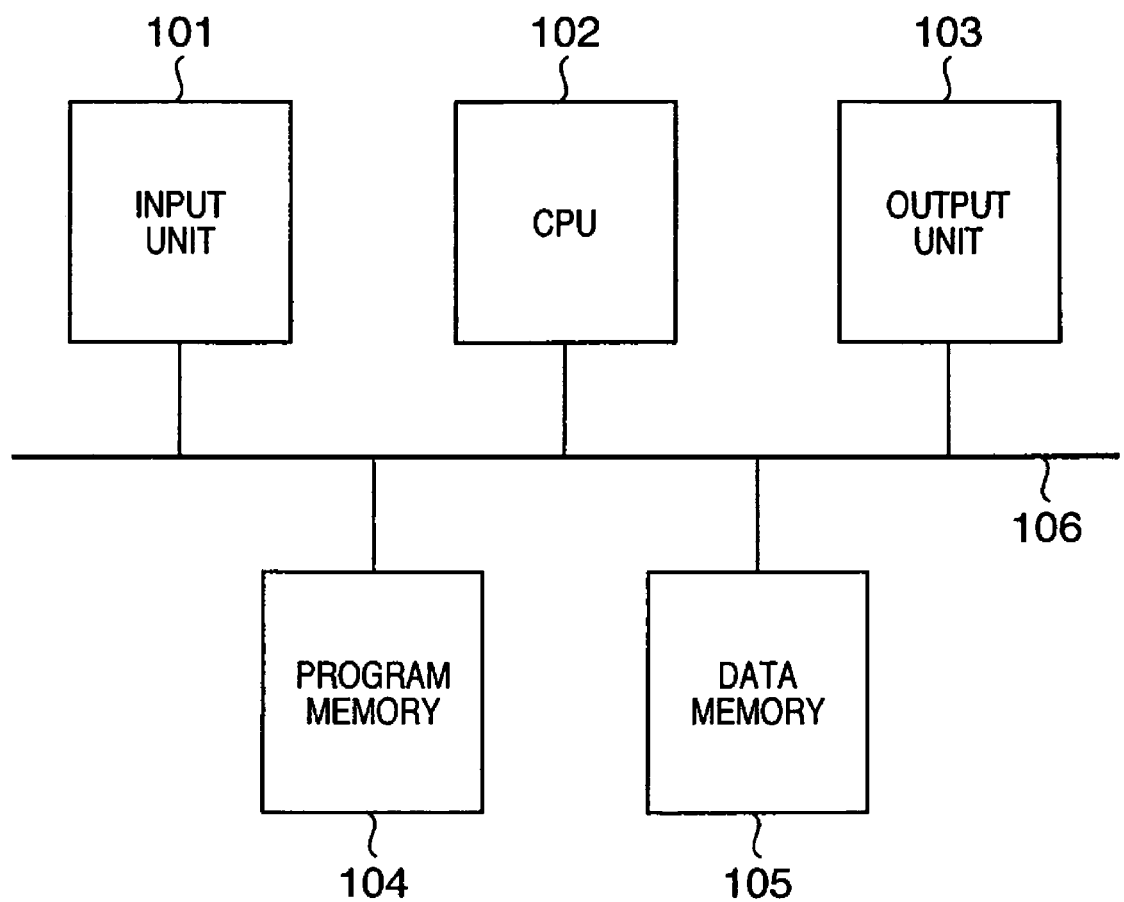
FIG. 1 is a block diagram showing a hardware configuration of information processing apparatus in an embodiment.

FIG. 1 is a block diagram showing a hardware configuration of information processing apparatus in an embodiment. In FIG. 1, the reference numeral 101 denotes an input unit for inputting information (data), and is connected to a photographing device or the like to be described later, for example. The reference numeral 102 denotes a CPU, which performs calculation, logical determination or the like for various types of processing, and controls each component connected to a bus to be described later. The reference numeral 103 denotes an output unit for outputting information (data), and is connected to an image forming device including a display such as an LCD, a CRT or the like to be described later, a printer or the like, for example.

The reference numeral 104 denotes program memory for storing a program which includes a processing procedure shown by the flowchart to be described later and which is for controlling by a CPU 102. The program memory 104 may be ROM, or may be RAM to which a program is loaded from an external storage device or the like. The reference numeral 105 denotes data memory and stores data generated in various types of processing. The data memory 105 is assumed to be RAM, for example, and it is loaded prior to processing from a non-volatile external storage medium, or referenced each time it is needed.

Then, the reference numeral 106 denotes a bus for transferring address signals for designating respective components to be controlled by the CPU 102, control signals for controlling respective components, and data which is exchanged among respective components.

First Embodiment

First, by using FIG. 2 to FIG. 11, grouping processing in the first embodiment for collectively designating a group of devices which can exchange data among the devices without changing settings of a plurality of pieces of information processing apparatus will be described.

Figure 2:
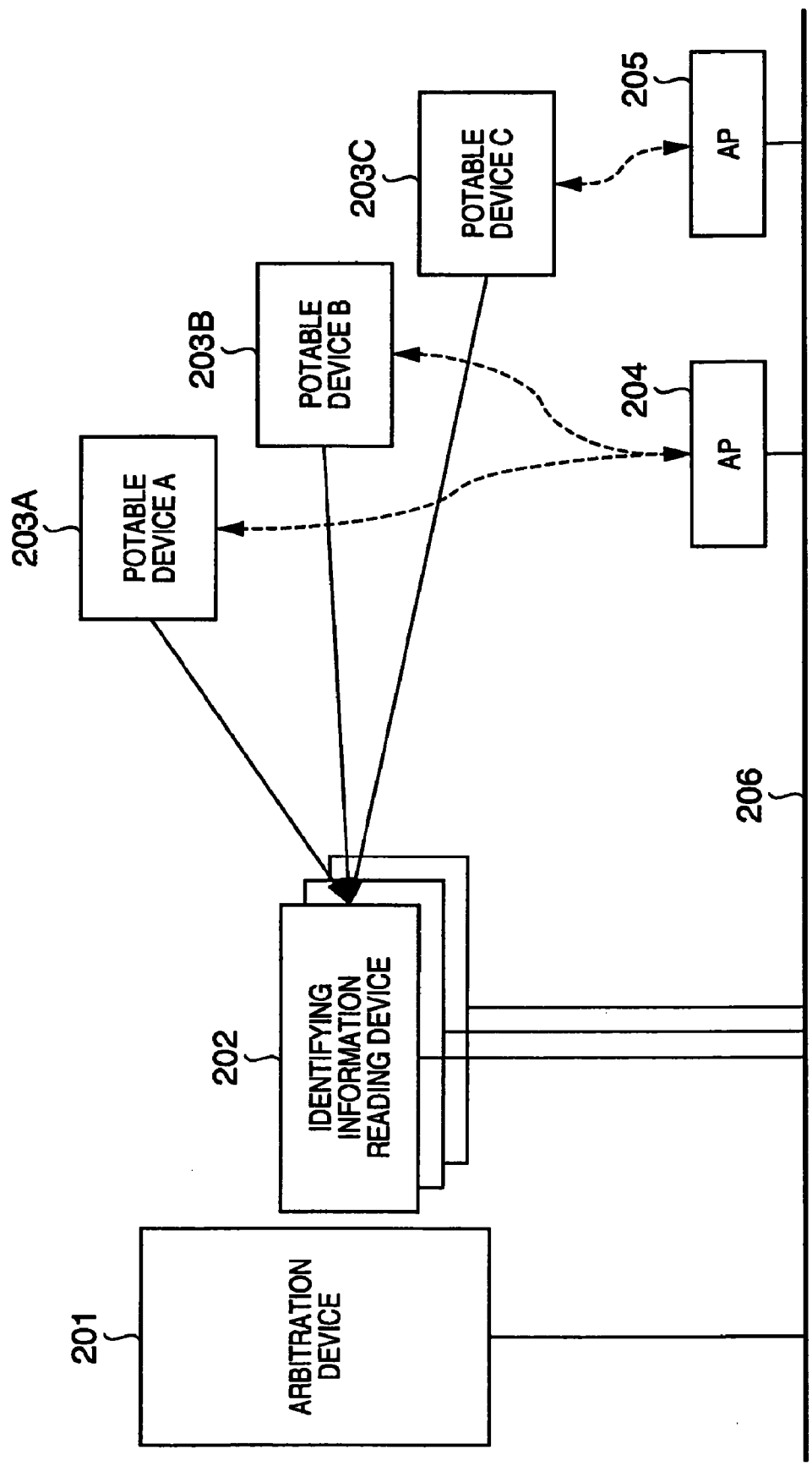
FIG. 2 is a diagram showing an example of a system image in a first embodiment.

FIG. 2 is a diagram showing an example of a system image in the first embodiment. A system shown in FIG. 2 is a system consisting of a plurality of pieces of information processing apparatus present on a wired or wireless network. Specifically, an arbitration device 201 and a plurality of identifying information reading devices 202a-202n are connected via a network 206, further connected to portable devices 203A, 203B, and 203C via access points 204, 205.

The portable devices 203A, 203B connected to an access point 204 can be accessed with each other but cannot be accessed with the portable device 203C which is connected to another access point 205. On the other hand, all the portable devices (203) can access the arbitration device 201.

In such an environment, the portable device 203 is placed in the identifying information reading device 202. With each function of the identifying information reading device 202, identifying information (serial number, ID or the like) of the portable device 203 is read and sent to the arbitration device 201, and grouping of devices to be described later is realized. Here, as each function, for example, a non-contact ID tag reading function, a USB connecting function, an infrared communicating function, a barcode reading function, a manuscript reading function or the like are known.

Wireless communication between access points 204, 205 and a portable device 203 may be general wireless communication, and a communication setting state of the portable device 203 needs not to be changed when the first embodiment is executed.

Figure 3:
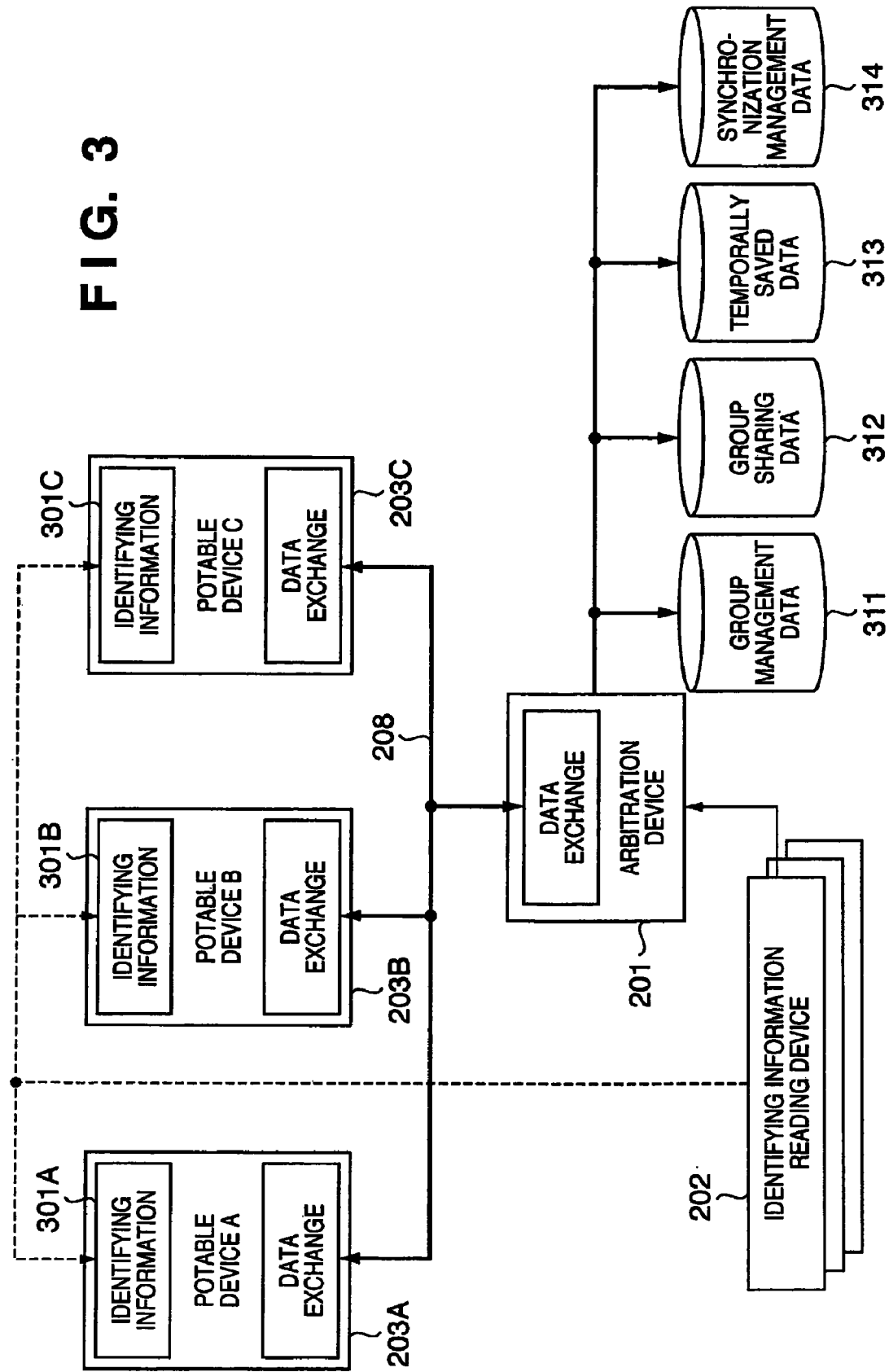
FIG. 3 is a system block diagram showing a configuration when a system image shown in FIG. 2 is realized.

FIG. 3 is a system block diagram showing a configuration when a system image shown in FIG. 2 is realized. In FIG. 3, identifying information 301 of the portable device 203 read by the identifying information reading device 202 is used by the arbitration device 201. The arbitration device 201 performs grouping of portable devices 203 by using the identifying information 301 according to user's designation and generates group management data 311. Hereinafter, the arbitration device 202 receives a data obtaining request from each portable device 203 and receives data from the corresponding another device within a limit of the group management data 311 by proxy and sends the data to a requesting device.

According to the synchronization management data 314 generated in response to user's designation, group sharing data 312, temporally saved data 313 are updated and a data access among portable devices 203 is made more efficient.

Figure 4:
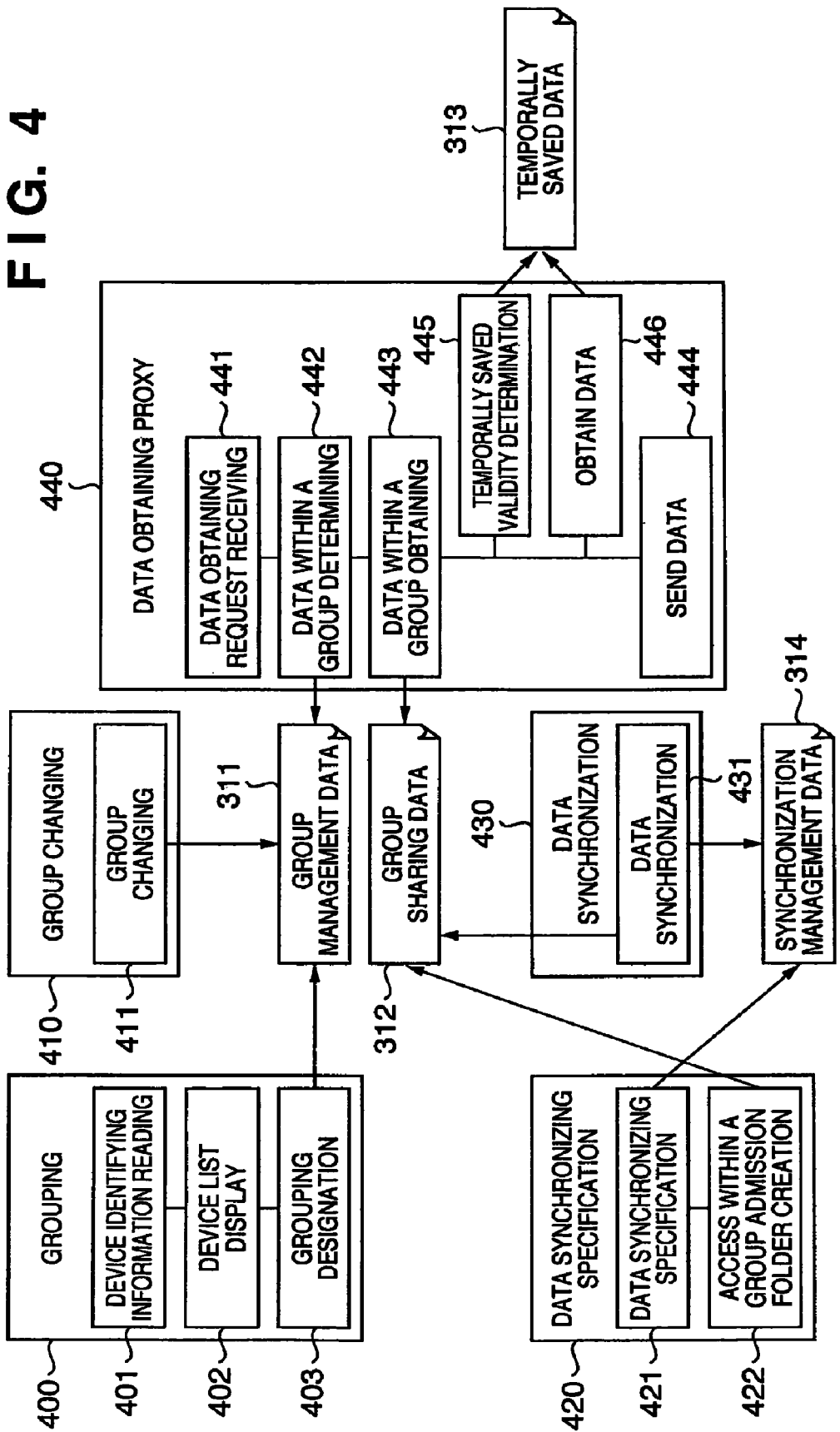
FIG. 4 is a functional block diagram showing a function of an arbitration device 201 in the first embodiment.

FIG. 4 is a functional block diagram showing a function of the arbitration device 201 in the first embodiment. As shown in FIG. 4, it is largely divided into functions of grouping 400, group changing 410, data synchronizing specification 420, data synchronization 430, and data obtaining proxy 440. The grouping 400 provides a function of grouping devices which can access each other's data. The group changing 410 provides a function of changing a configuration of grouped devices. The data synchronizing specification 420 provides a function of specifying a method for synchronizing data. The data synchronization 430 provides a function of synchronizing data among devices. And, the data obtaining proxy 440 provides a function of obtaining data between two devices by proxy.

The grouping 400 consists of a device identifying information reading unit 401 for reading identifying information of another device, a device list display unit 402 for displaying a list of devices, and a grouping designation unit 403 for generating group management data 311 in response to user's grouping designation.

The group changing 410 consists of a group changing unit 411 for changing group management data 311 in response to user's designation to change a group configuration.

The data synchronizing specification 420 consists of data synchronization specifying unit 421 for generating synchronization management data 314 in response to user's designation to synchronize, and access within a group admission folder creating unit 422 for generating group sharing data 312 for executing synchronizing processing.

The data synchronization 430 consists of data synchronization unit 431 for updating group sharing data 312, according to definition of the synchronization management data 314.

The data obtaining proxy 440 consists of a data obtaining request receiving unit 441, a data within a group determining unit 442, a data within a group obtaining unit 443, and a data sending unit 444. The data obtaining request receiving unit 441 receives a data obtaining request from another device. The data within a group determining unit 442 determines whether the requesting device and the requested device are present within a range admitted to be accessed or not by referencing the group management data 311. The data within a group obtaining unit 443 obtains data from any of the synchronized group sharing data 312, the temporally saved data 313 in which accessed data is temporally saved, and the requested another device. The data sending unit 444 sends obtained data to the requesting another device.

The data within a group obtaining unit 443 consists of a temporally saved validity determination unit 445 for determining whether temporally saved data is valid or not, and data obtaining unit 446 for obtaining data from the requested another device and updating temporally saved data 313.

Figure 5:
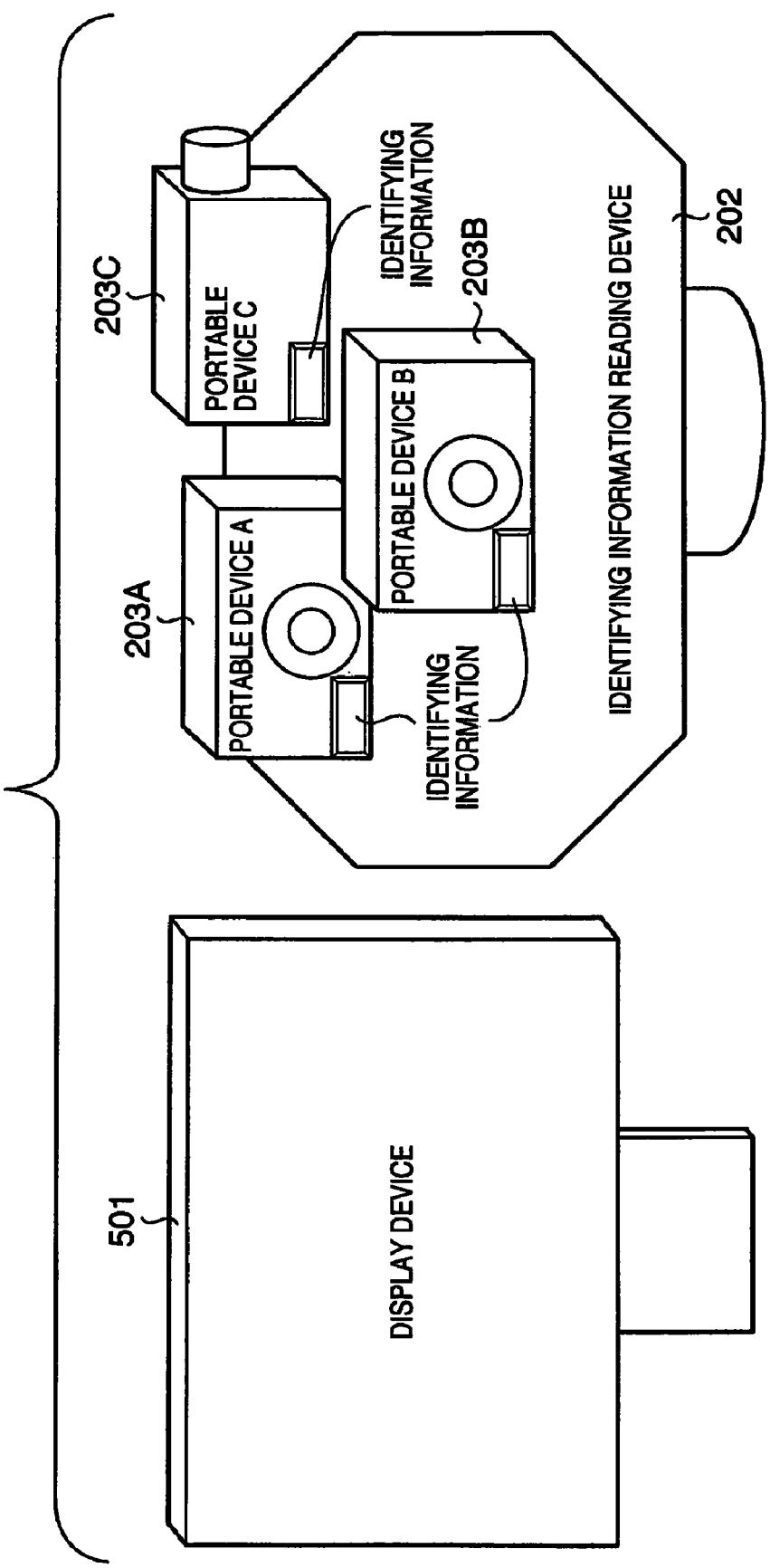
FIG. 5 is a diagram showing an example of a system image of grouping operation in the first embodiment.

FIG. 5 is a diagram showing an example of a system image of grouping operation in the first embodiment. The system performs grouping operation by using identifying information 301 read in from portable devices 203A, 203B, and 203C placed on the identifying information reading device 202 and listing respective portable devices 203 on a display device 501 of the arbitration device 201.

Figure 6:
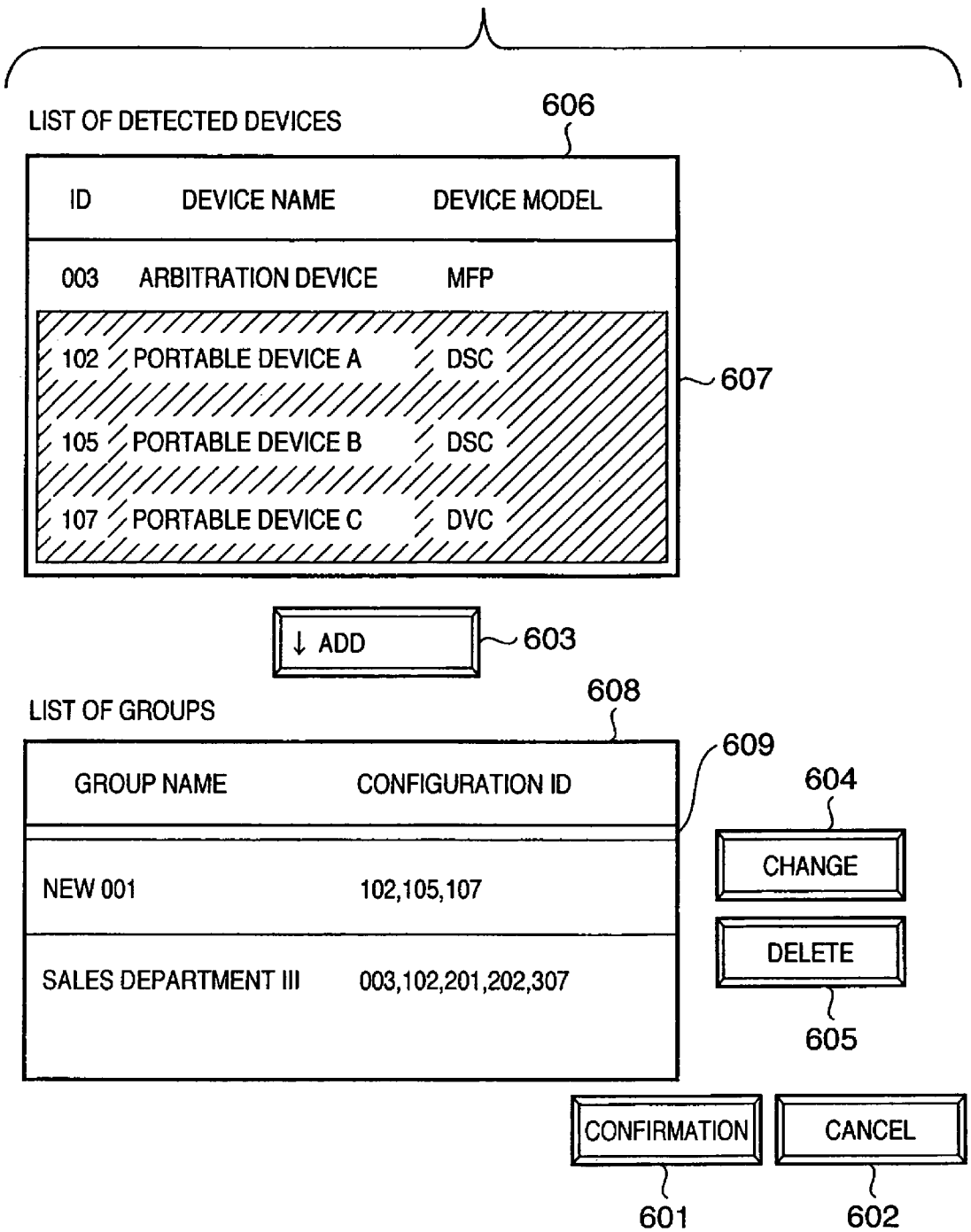
FIG. 6 is a diagram showing an example of a grouping operation screen displayed on a display device 501.

FIG. 6 is a diagram showing an example of a grouping operation screen displayed on the display device 501. As shown in FIG. 6, a list of detected devices 606 lists the arbitration device in addition to the portable devices A, B, and C. The operation screen shows that only the portable devices A, B, and C are displayed as selected 607, and the arbitration device is displayed as not selected.

It is shown that when an add button 603 is pressed in this state, a new group 609 is added to the group list 608. Specifically, it shows a state that a group named "new 001" consisting of the selected portable devices A, B, and C is added. Further, in the group list, a change button 604 for changing a configuration of existing groups, and a delete button 605 for deleting an existing group are placed. And, a confirmation button 601 for confirming the operation or a cancel button 602 for canceling the operation is placed.

Figure 7:
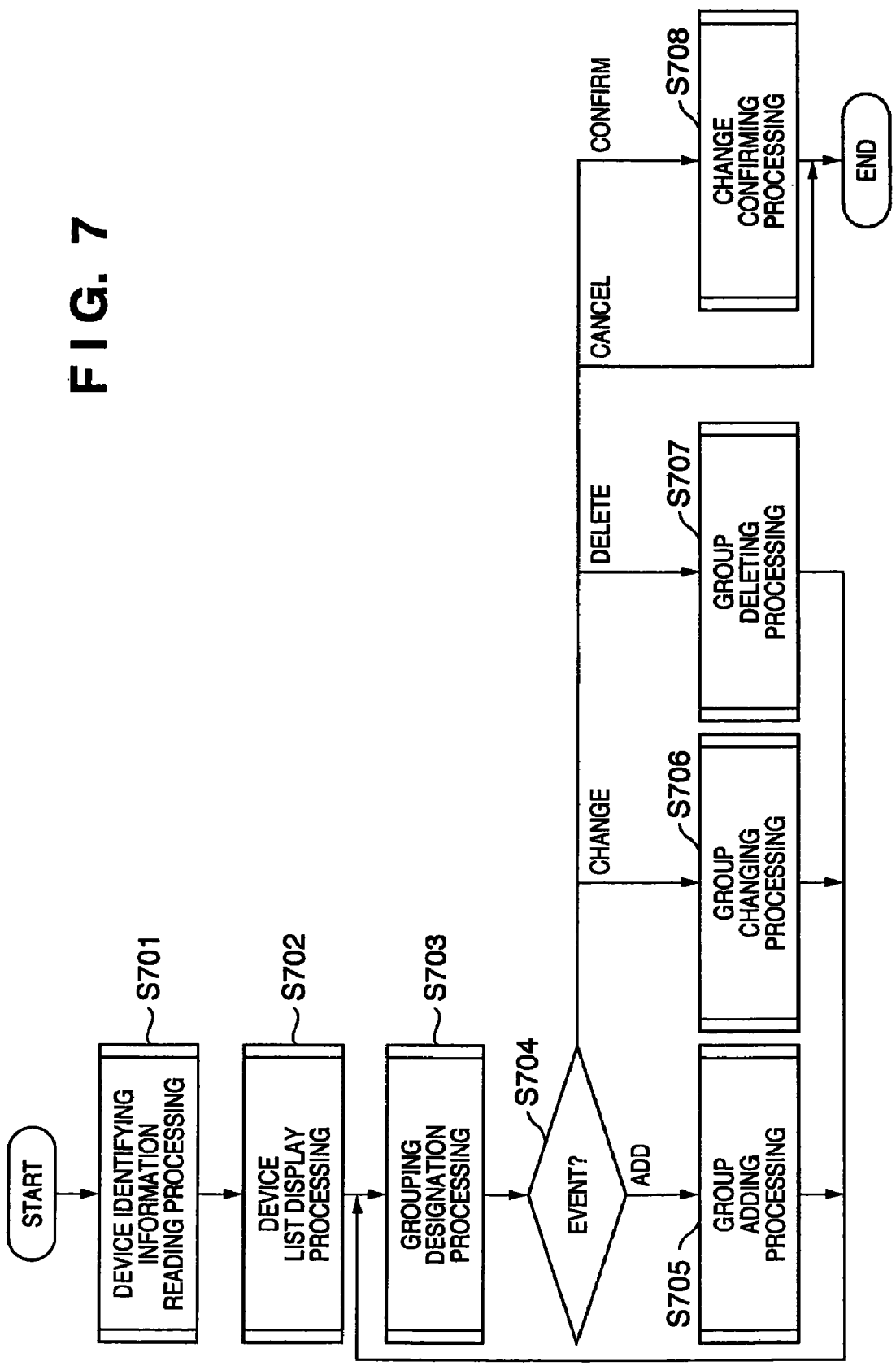
FIG. 7 is a flowchart showing grouping processing in the first embodiment.

FIG. 7 is a flowchart showing grouping processing in the first embodiment. First, identifying information of a plurality of portable devices 203 placed on the identifying information reading device 202 is read by the device identifying information reading unit 401 at the step S701, and it is listed by the device list display unit 402 at the step S702. A user's operation performed on the list display is processed by the grouping designation unit 403 at the step S703 and branched at the step S704. If it is determined as operation of adding a new group at the step S704, the operation proceeds to the step S705 and the new group is added by the group adding processing, and the operation returns to the step S703 and the abovementioned processing is repeated.

If it is determined as operation of changing a configuration of existing groups at the step S704, the operation proceeds to the step S706 and the configuration of the existing groups is changed by the group changing unit 411, and the operation returns to the step S703 and the abovementioned processing is repeated. If it is determined as operation of deleting an existing group at the step S704, the operation proceeds to the step S707, and the existing group is deleted by group deleting processing, and the operation returns to the step S703 and the above mentioned processing is repeated.

If it is determined as confirming operation at the step S704, the operation proceeds to the step S708, and operation details till then are confirmed by change confirming processing, and the processing ends. If it is determined as canceling operation at the step S704, the processing ends.

Figure 8:
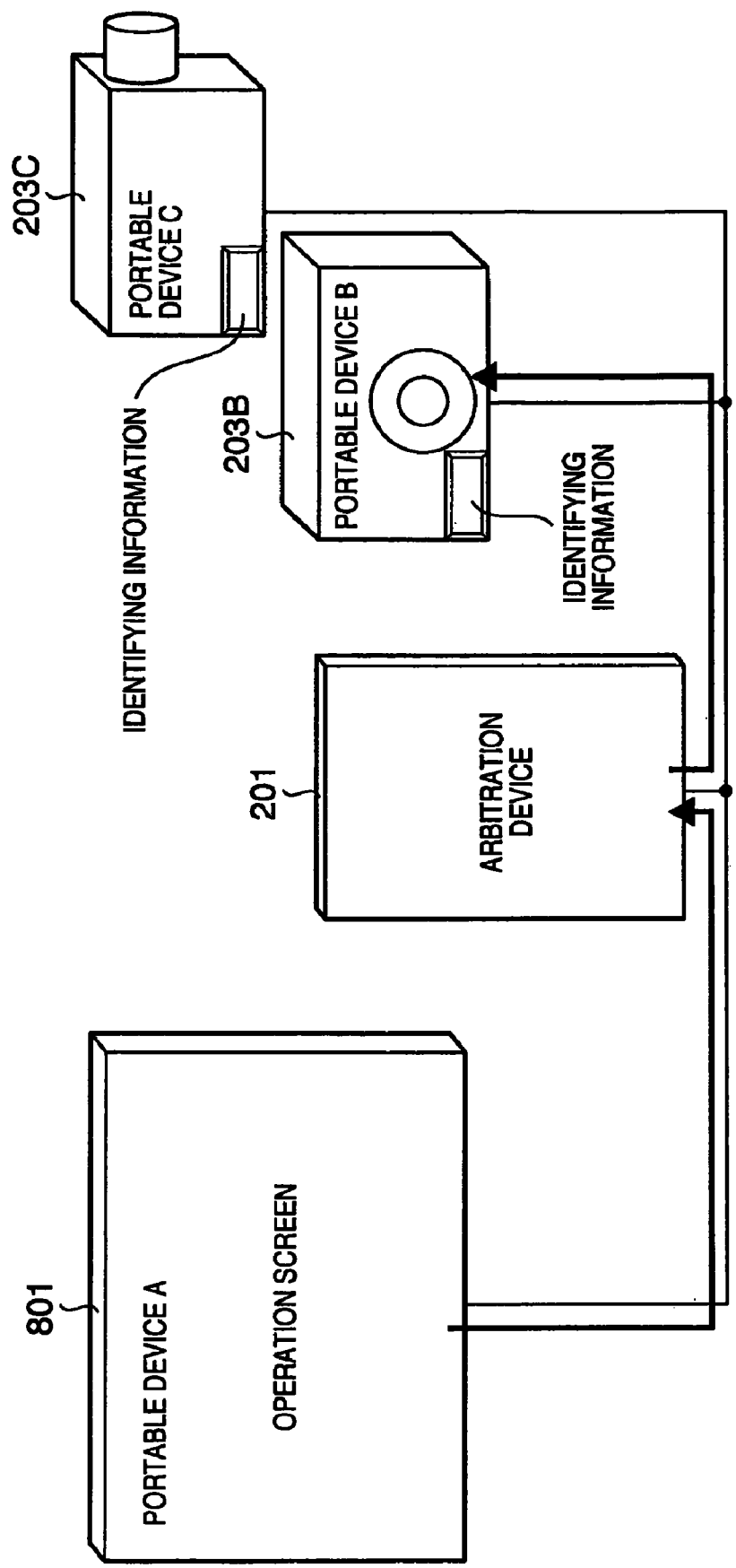
FIG. 8 is a diagram showing an example of a system image when data in another portable devices is accessed from an operation screen of a portable device A via the arbitration device.

FIG. 8 is a diagram showing an example of a system image when data of another portable device is accessed from an operation screen of the portable device A via the arbitration device. The arbitration device 201 shown in FIG. 8 is in a state that can be accessed by all the portable devices 203 via access points 204, 205. Then, it is shown how data access is intermediated from an operation screen 801 of the portable device 203A to the other portable devices 203B, 203C.

Figure 9:
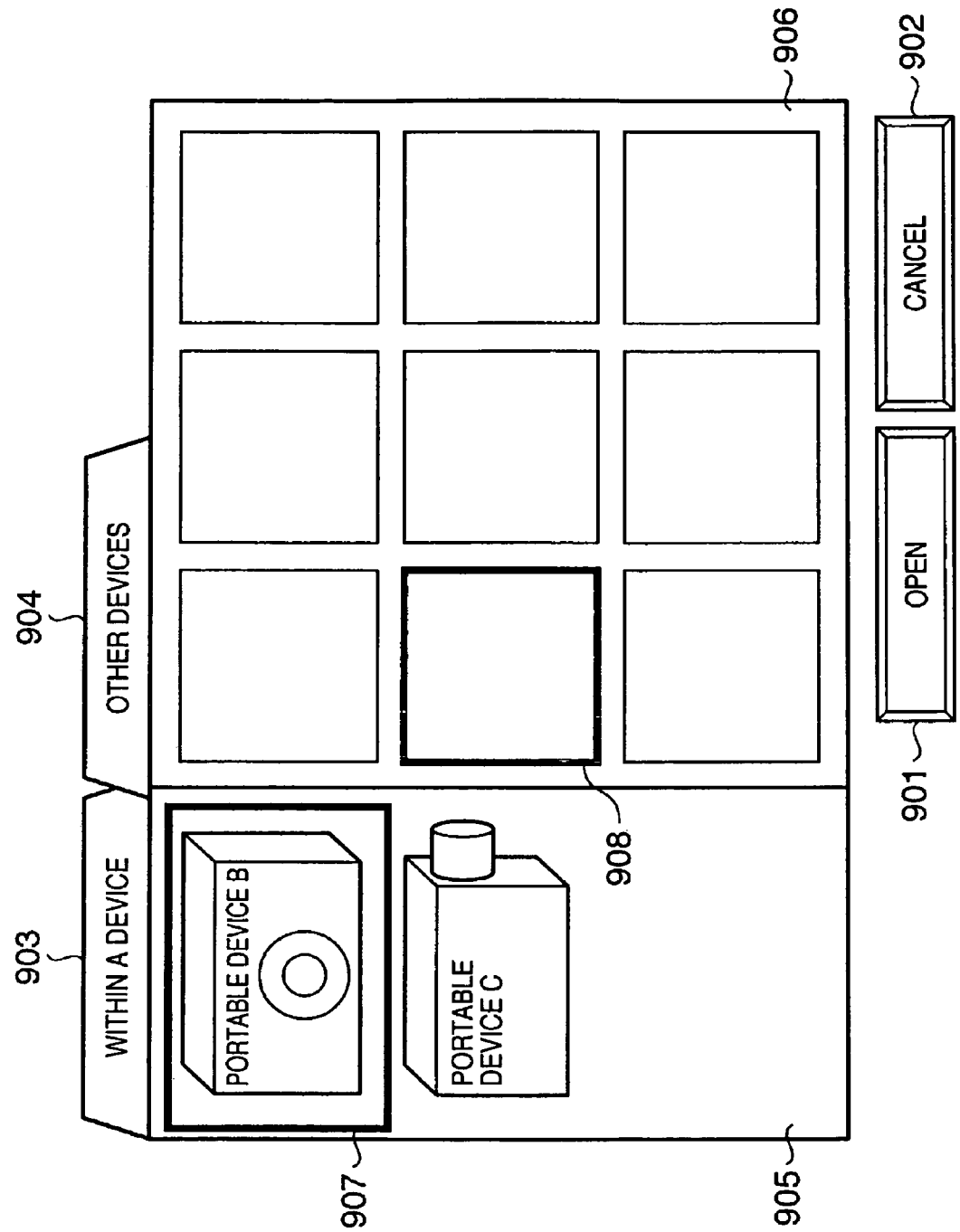
FIG. 9 is a diagram showing an example of data within a group obtaining operation screen displayed on an operation screen 801 of the portable device A shown in FIG. 8.

FIG. 9 is a diagram showing an example of a data within a group obtaining operation screen displayed on the operation screen 801 of the portable device A shown in FIG. 8. In the example shown in FIG. 9, it is shown that the other devices tab 904 is active among a within a device tab 903 and the other devices tab 904 for switching operation objects. It is also shown that another device selecting region 905 and data selecting region 906 are displayed in the screen and the portable device B and the data are selected by the reference numerals 907, 908.

In FIG. 9, an open button 901 for opening selected data and a cancel button 902 for canceling operation are also placed.

Figure 10:
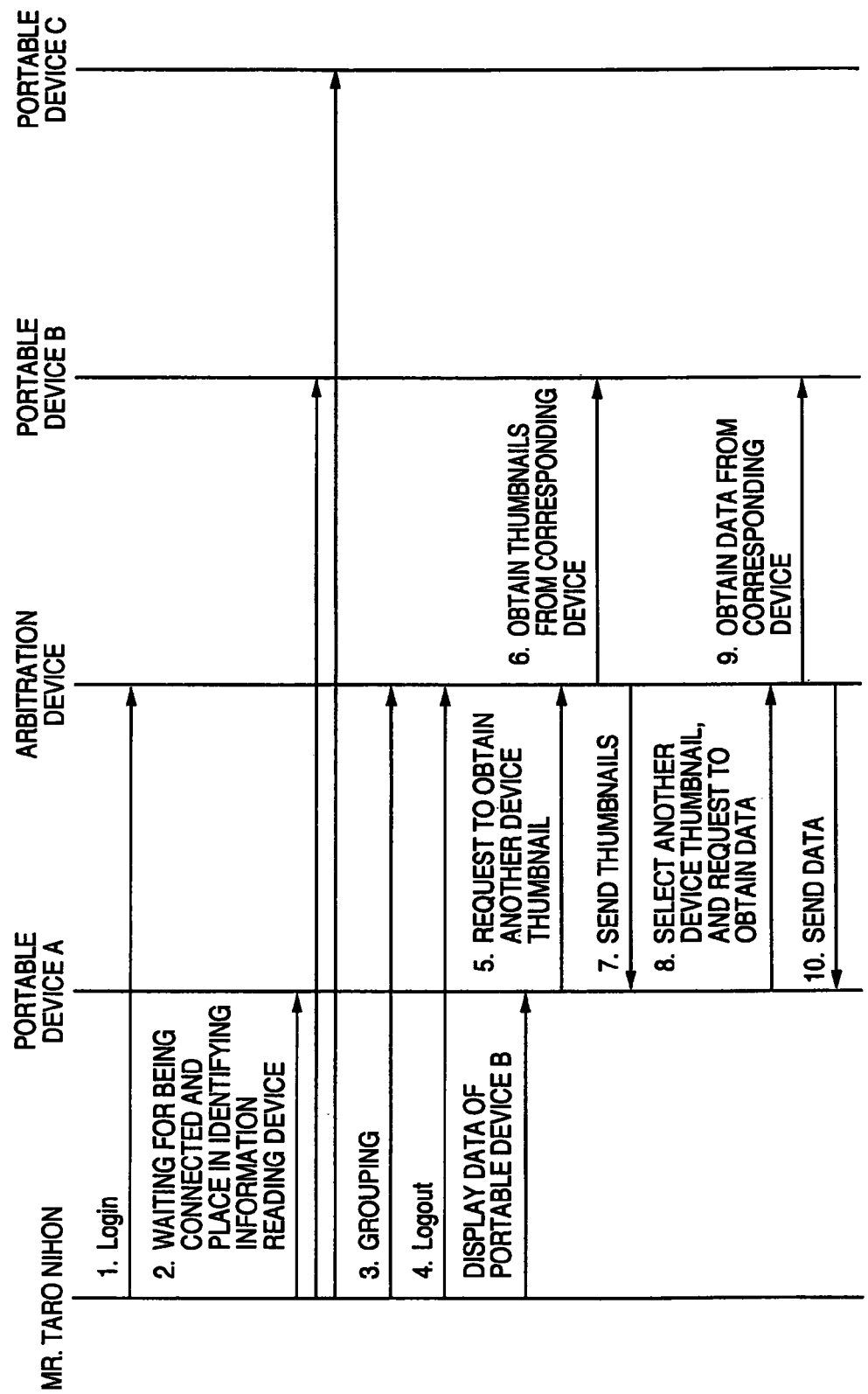
FIG. 10 is a diagram showing an example of a sequence of obtaining data within a group in the first embodiment.

FIG. 10 is a diagram showing an example of a sequence of obtaining data in a group in the first embodiment. It shows processing among devices forming the system and a flow of data in response to operation of obtaining data designated by the operation screen shown in FIG. 9. In FIG. 10, it is formed by two phases of operation of grouping a plurality of portable devices and operation of accessing data of another device in a group. First, in the phase of the grouping operation, "1. Login by performing authenticating operation of the arbitration device" is executed by operation of "Mr. Taro Nihon", a user, by using an arbitration device and a plurality of portable devices. Next, "2. Place in the identifying information reading device by executing authenticating operation of each portable device", and then "3. Grouping operation" is executed, and "4. Logout" is done.

Next, in the data access operation phase, after "5. A request to obtain thumbnails of another device" is executed in response to the operation done by "Mr. Taro Nihon" performed on the portable device A, "6. Thumbnails are obtained from the corresponding device", and the result of "7. Send the thumbnails" is displayed. Further, as a result of "8. A thumbnail of another device is selected and a request to obtain data" is done, "9. Data is obtained from the corresponding device". Then, the result of "10. Send data" is displayed. With the above flow, grouping of a plurality of devices and viewing of data of another device within a group is realized.

Figure 11:
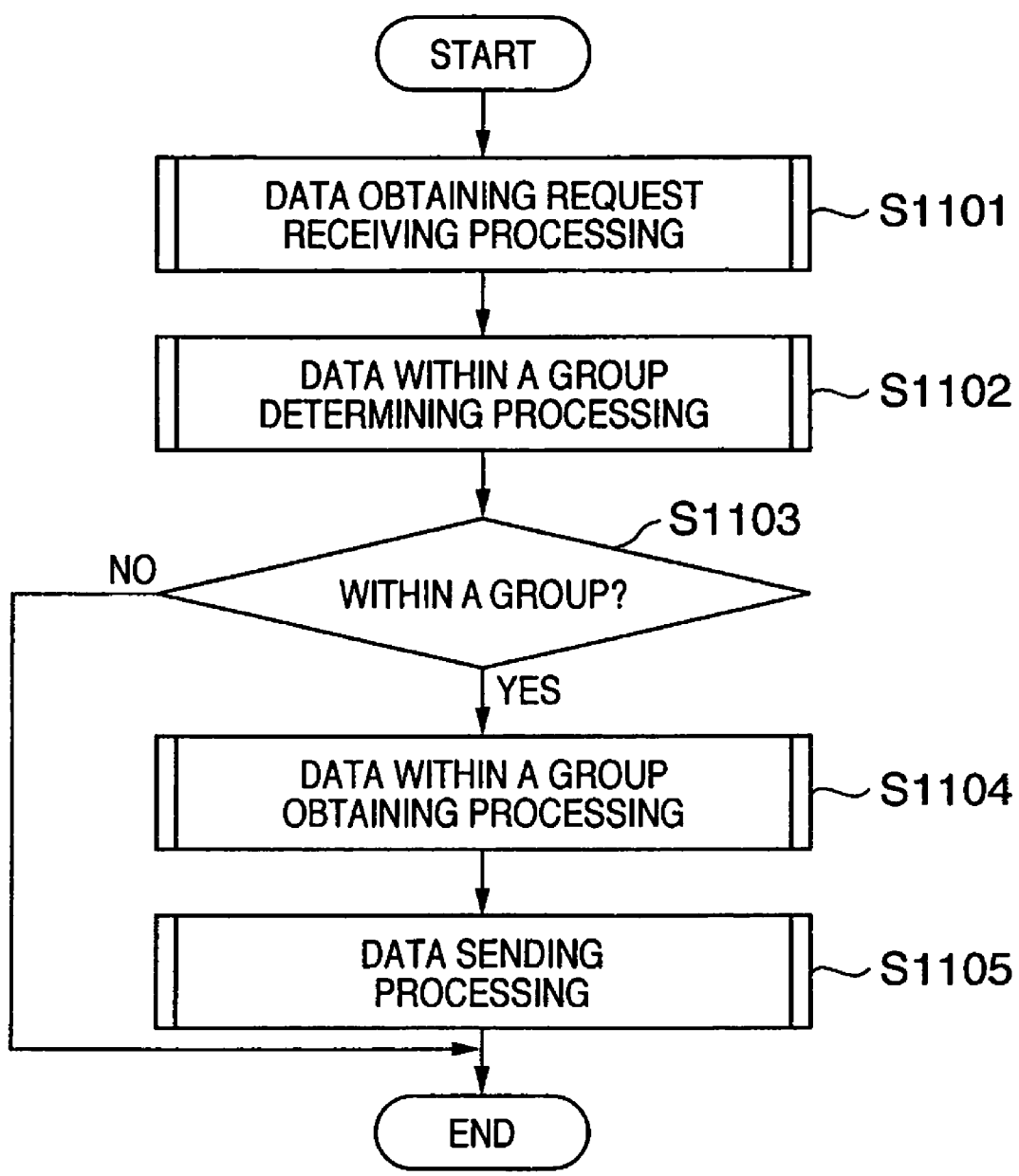
FIG. 11 is a flowchart showing data obtaining proxy processing in the first embodiment.

FIG. 11 is a flowchart showing data obtaining proxy processing in the first embodiment. First, at the step S1101, the data obtaining request receiving unit 441 receives a request to obtain data sent from another device, and at the following step S1102, the data within a group determining unit 442 determines whether both of the requesting device and the requested device are in the same group or not. Then if it is determined that they are in the same group at the step S1103, the operation proceeds to the step S1104, and the data within a group obtaining unit 443 obtains data from the requested another device. Next, at the step S1105, the data sending unit 444 sends data to the requesting device and the processing ends.

As described above, in the first embodiment, as grouping of a plurality of portable devices can be realized in an arbitration device, a setting of each portable device is never changed and conventional communication settings can be kept.

As such, according to the first embodiment, effects below can be obtained.

(1) A group of devices which can exchange data can be collectively specified without changing a setting of each device.

(2) Regardless of the specification of grouping, each device can individually keep communication with a non-objective device, and that can be realized without requiring all the objective devices to have the system for that purpose.

(3) Intuitive and secured operation can be realized, when devices desired to be grouped are actually treated and the result is checked by the list.

(4) Operation load can be alleviated, when devices desired to be grouped are collectively treated.

(5) Various methods can be used in operation.

Second Embodiment

Next, with FIG. 12 and FIG. 13, a second embodiment according to the present invention will be described in detail. The second embodiment will be described by taking an example of a case where a group setting can be changed even if the other devices are in a state where communication is unavailable. Specifically, a case where a new device is added to an existing group without a setting of each device being changed will be described.

Figure 12:
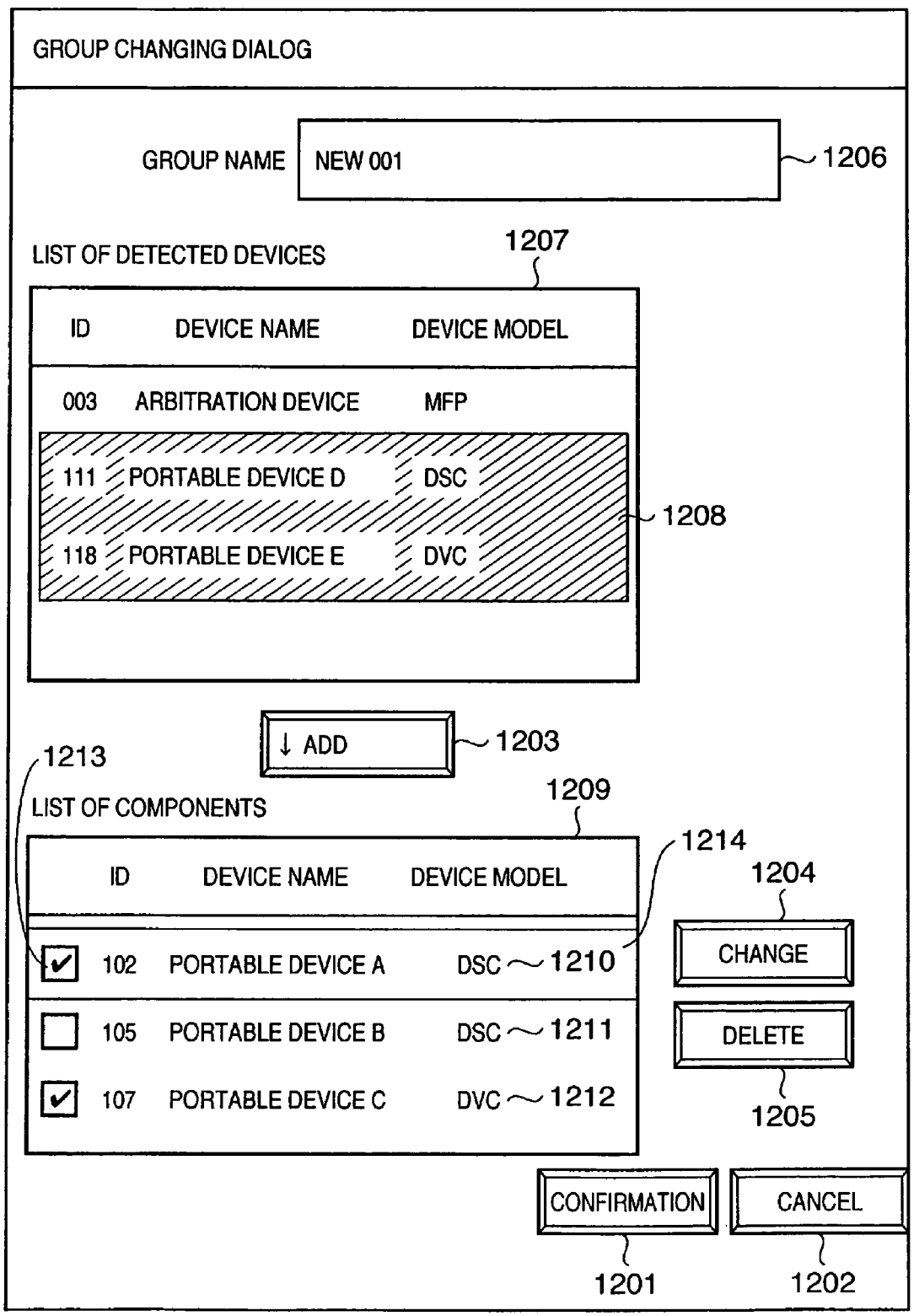
FIG. 12 is a diagram showing an example of a group changing operation screen displayed on an operation screen.

FIG. 12 is a diagram showing an example of a group changing operation screen displayed on an operation screen. On the group changing dialog, a group name 1206 of the existing group to be changed is displayed, and a portable devices D, E which are not included in a configuration of the existing group and which are newly detected at the operating time, and the arbitration device are displayed in a device list 1207. The operation screen is displayed in a state 1208 where only the portable devices D, E are selected and with the arbitration device being displayed as not selected.

When an add button 1203 is pressed down in this state, the portable devices D, E are added to a list of components within a group 1209. In the list of components within a group 1209, a change button 1204 for designating to change between valid and invalid of the selected components 1214, and a delete button 1205 for designating to delete are placed. A confirmation button 1201 for confirming the operation, and a cancel button 1202 for canceling are also placed.

A check box 1213 which enables the same designation as that of the change button 1204 is provided, and that enables to switch between valid and invalid. Specifically, it is shown that the portable devices A (1210) and C (1212) are valid and the portable device B (1211) is temporally invalidated. That is to say, in this example, it is shown that the portable device B is temporally not treated as a component in the group.

Figure 13:
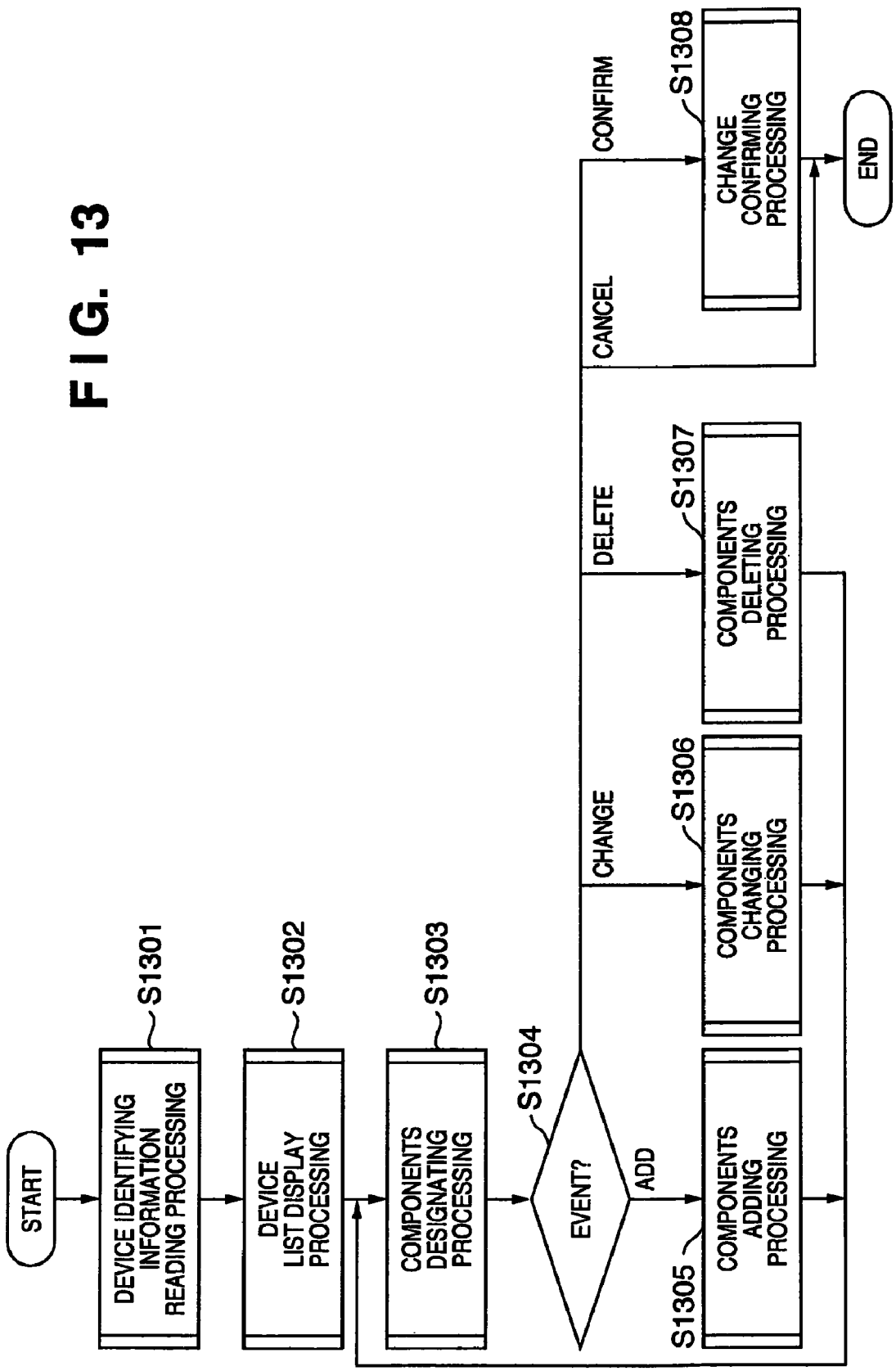
FIG. 13 is a flowchart showing group changing processing in a second embodiment.

FIG. 13 is a flowchart showing group change processing in the second embodiment. First, at the step S1301, identifying information of a plurality of portable devices placed on the identifying information reading devices 202 is read by the device identifying information reading unit 401, and at the step S1302, it is listed by the device list display unit 402. User operation performed on the list display is processed by component designation processing at the step S1303, and branched at the step 1304. If it is determined as adding operation to the existing components at the step S1304, the operation proceeds to the step S1305, and they are added by component adding processing, and the operation returns to the step S1303, and the abovementioned processing is repeated.

If it is determined as setting change operation between valid and invalid of an existing component at the step S1304, the operation proceeds to the step S1306, and a valid and invalid setting of the existing component is changed by the component changing processing, and the operation returns to the step S1303, and the abovementioned processing is repeated. If it is determined as deleing operation from the existing components at the step S1304, the operation proceeds to the step S1307, and it is deleted from the existing components by the component deleting processing, and the operation returns to the step S1303, and the abovementioned processing is repeated.

If it is determined as confirming operation at the step S1304, the operation proceeds to the step S1308, and the operation details till then are confirmed by the change confirmation processing, and the processing ends. If it is determined as canceling operation at the step S1304, the processing ends.

As mentioned above, in the second embodiment, as change of components in the group can be realized in the arbitrary device, conventional communication settings can be kept without changing the setting of each portable device.

As such, according to the second embodiment, a setting can be changed regardless of a state of each device.

Third Embodiment

Next, by using FIG. 14 to FIG. 16, a third embodiment according to the present invention will be described in detail. The third embodiment will be described by taking an example of a case where the same other devices can belong to a plurality of groups.

Figure 14:
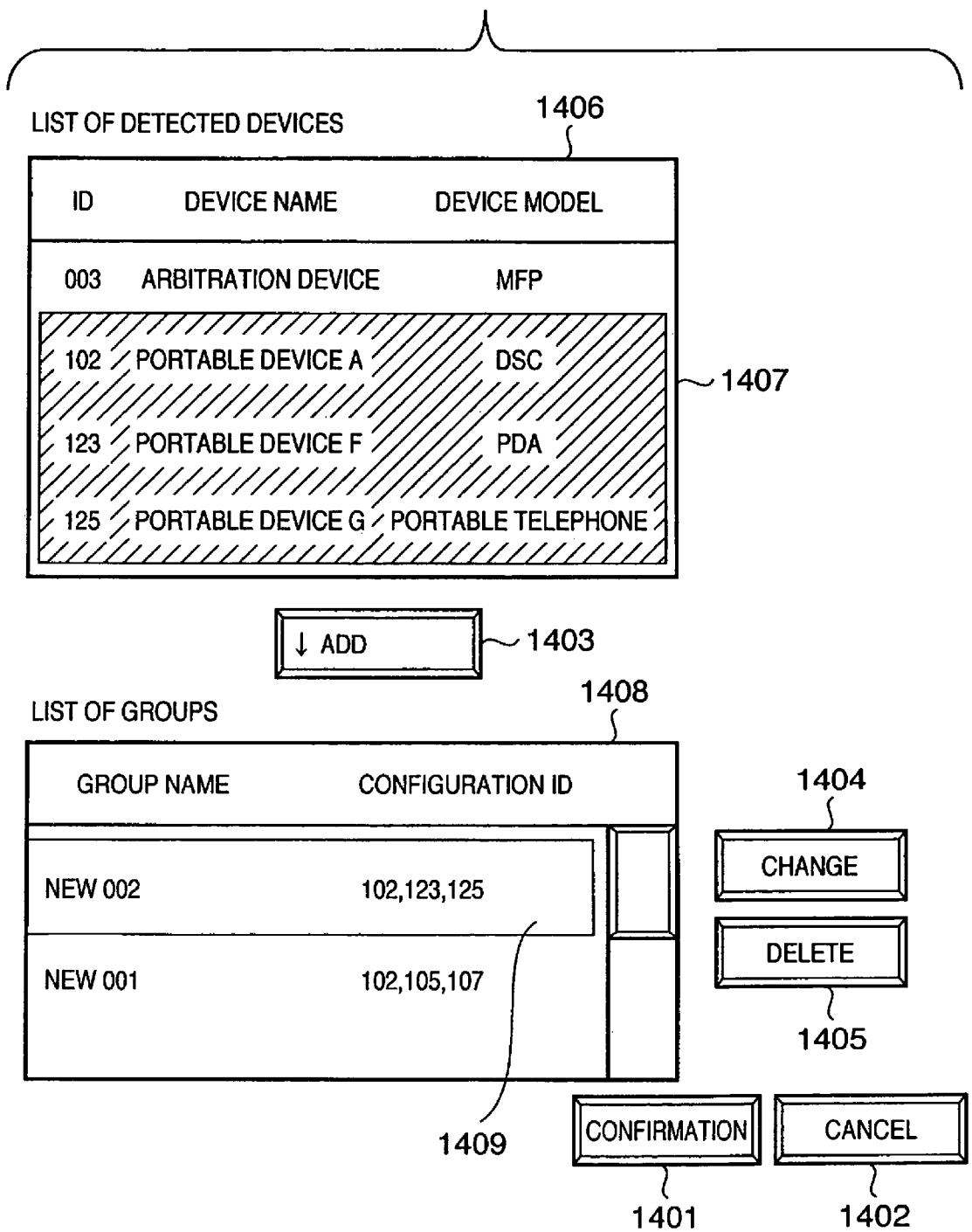
FIG. 14 is a diagram showing an example of a grouping operation screen to cause a device forming an existing group to belong to a new group.

FIG. 14 is a diagram showing an example of a grouping operation screen to cause devices forming an existing group to belong to a new group. On the list of detected devices 1406 on the grouping operation screen shown in FIG. 14, the arbitration device in addition to the portable device A which has already formed an existing group "new 001" placed on the identifying information reading device 202, and portable devices F and G which does not belong to any group are listed. It is shown that only the portable devices A, F, and G are displayed as selected on the operation screen, and the arbitration device is displayed as not selected.

It is shown that when an add button 1403 is pressed down in this state, a new group 1409 is added to the group list 1408. Specifically, a group named "new 002" consisting of the selected portable devices A, F, and G. is added. That is to say, a component of ID=102 corresponding to the portable device A belongs to two groups of "new 002" and "new 001". In the group list, a change button 1404 for changing a configuration ID of the new group and a delete button 1405 for designating to delete are placed. A confirmation button 1401 for confirming the operation and a cancel button 1402 for canceling are also placed.

FIG. 15 is a diagram showing an example of group management data created by a grouping operation screen. As shown in FIG. 15, a group name, a configuration ID showing a group of devices forming a group, and pausing configuration ID Which temporally stops to be used among them are recorded in the group management data. For example, it is shown that, as group management data 1501, the group name is "sales department III" and it consists of devices of component IDs 003, 102, 201, 202, and 307, and devices 201 and 202 temporally stop to be used. The new group added in the example shown in FIG. 14 is recorded as group management data 1503, in addition to group management data 1502.

Figure 16:
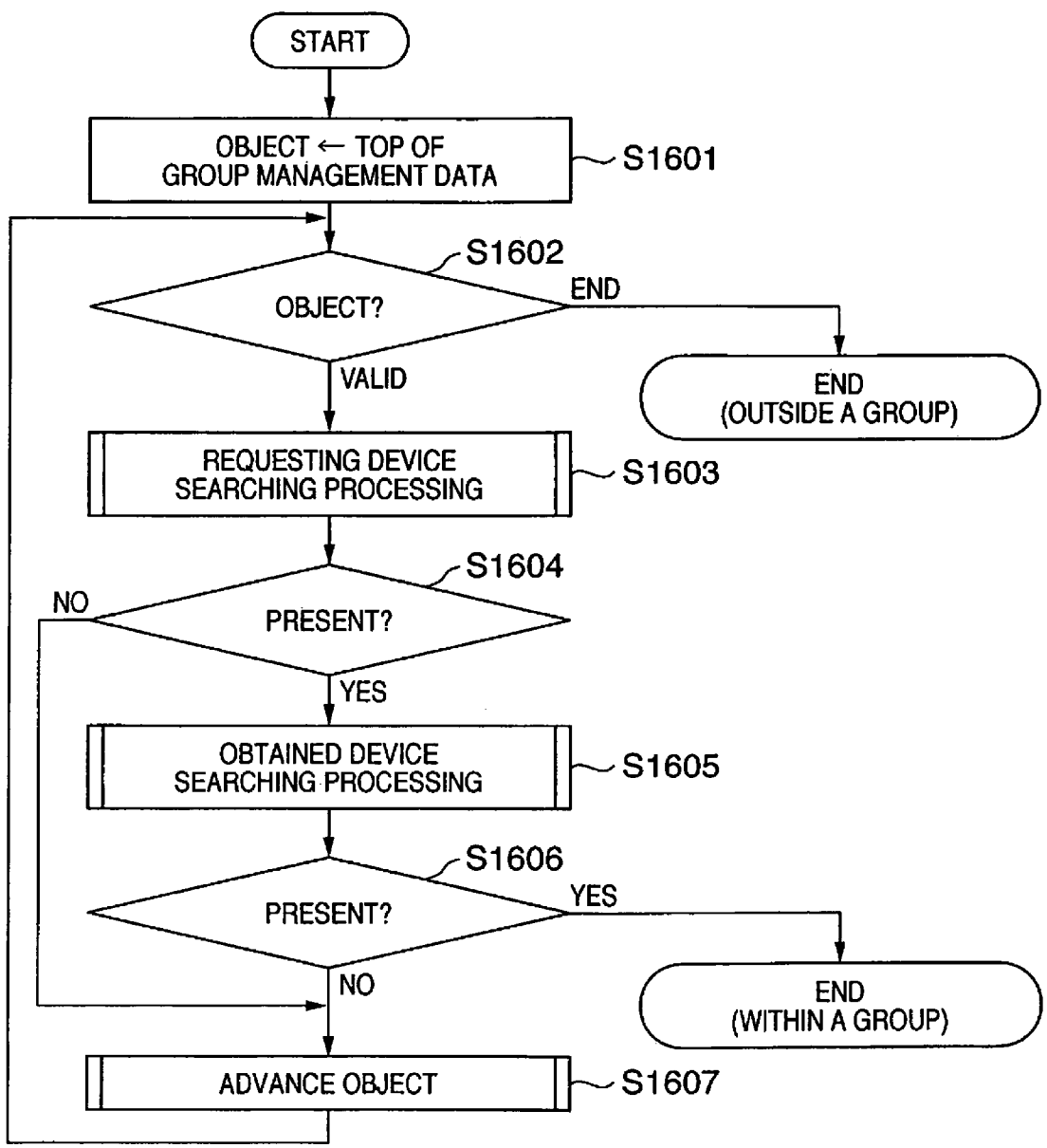
FIG. 16 is a flowchart showing data within a group determination processing in a third embodiment.

FIG. 16 is a flowchart showing data within a group determining processing in the third embodiment. First, at the step S1601, the top of the group management data is initialized as an object, and the processing after the step S1602 is repeated. If it is determined that the object is valid at the step S1602, the operation proceeds to the step S1603, and whether the requesting device is included in a group of devices that forms objective group management data or not is searched by requesting device searching processing. Then, if the requesting device is not included at the step S1604, the operation proceeds to the step S1607, and the object is advanced, and the operation returns to the step S1602, and the abovementioned processing is repeated.

If the requesting device is included at the step S1604, the operation proceeds to the step S1605, and whether an obtained device is included in a group of devices that forms objective group management data is searched by obtained device searching processing. Then, if the obtained device is included at the step S1606, both of the requesting device and obtained device are included, it is determined as "within the group", and the processing ends. If the obtained device is not included at the step S1606, the operation proceeds to the step S1607, and the object is advanced, and the operation returns to the step S1602, and the abovementioned processing is repeated.

After the abovementioned processing is repeated, if it is determined that the object ends at the step S1602, a group in which the requesting device and the obtained device are included at the same time is not present, thus, it is determined as "outside the group", and the processing ends.

As mentioned above, the third embodiment can appropriately process even if a device belongs to a plurality of groups at the same time.

As such, according to the third embodiment, a device can belong to a plurality of groups at the same time.

Fourth Embodiment

Next, by using FIG. 17 to FIG. 21, a fourth embodiment according to the present invention will be described in detail. The fourth embodiment will be described by taking an example of a case where grouping is designated after physical place of the other devices are checked.

Figure 17:
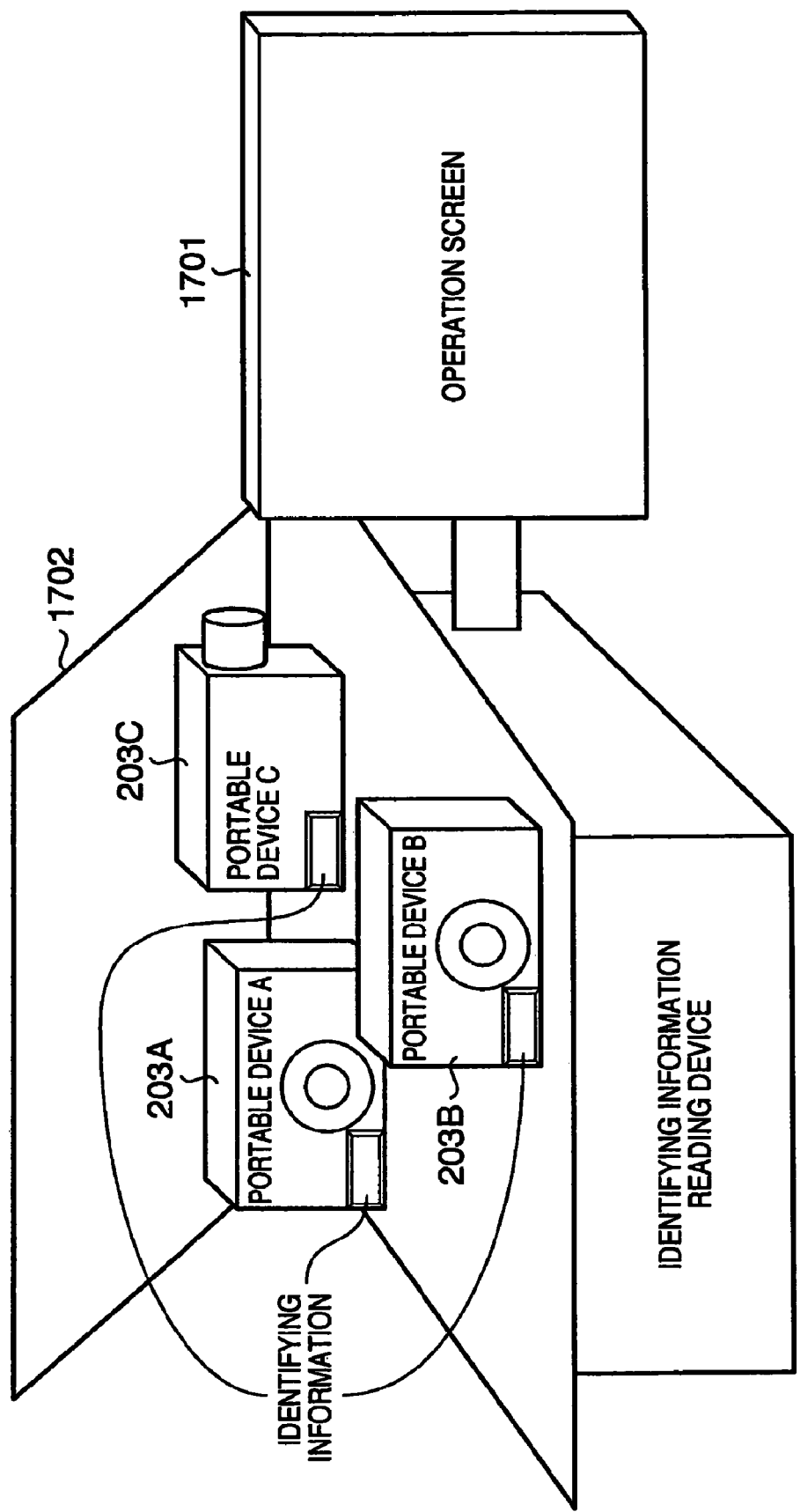
FIG. 17 is a diagram showing an example of a system image when a plurality of portable devices are grouped in a fourth embodiment.

FIG. 17 is a diagram showing an example of a system image when a plurality of portable devices is grouped in the fourth embodiment. The example shown in FIG. 17 is a case where a device particularly with a manuscript reading mechanism such as a copying machine, a scanner or the like as an identifying information reading device is used. The system shown in FIG. 17 visualizes that groping operation is performed as the portable devices A, B, and C are listed on an operation screen 1701 by using identifying information read in from the portable devices 203A, 203B, and 203C placed on the identifying information reading device 1702.

Figure 18:
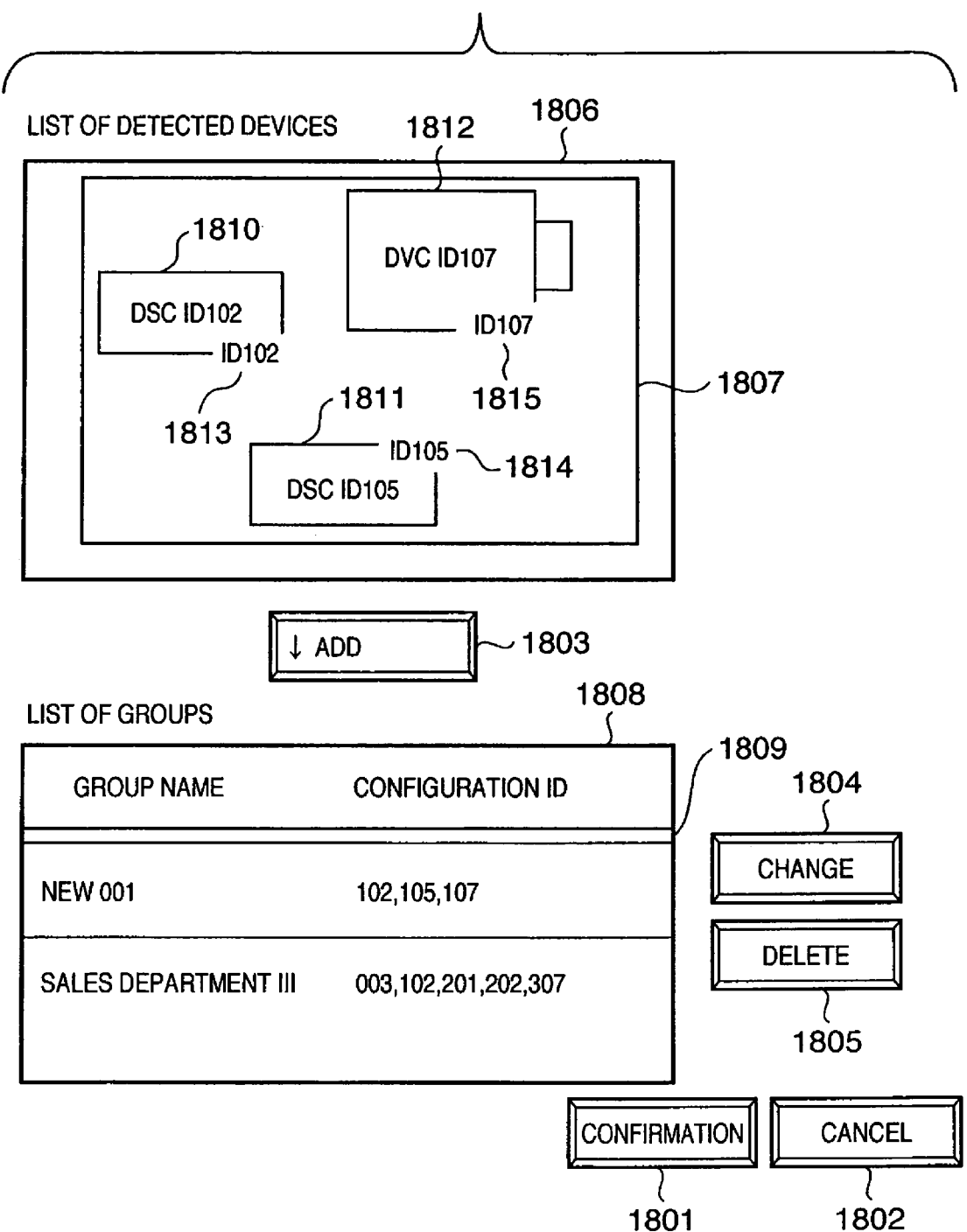
FIG. 18 is a diagram showing an example of a grouping operation screen displayed on an operation screen 1701.

FIG. 18 is a diagram showing an example of a grouping operation screen displayed on the operation screen 1701. On a list of detected devices 1806 shown in FIG. 18, the portable devices A, B, and C are mapped and listed on a still image read in by the manuscript reading mechanism. On the operation screen, a still image region including the portable devices A, B, and C is displayed as a selected region 1807.

It is shown that a new group 1809 is added to the group list 1808 when an add button 1803 is pressed down in this state. Specifically, a group named "new 001" that consists of selected portable devices A, B, and C is added. On the group list, a change button 1804 for changing a configuration of existing groups, and a delete button 1805 for designating to delete are placed. A confirmation button 1801 for confirming the operation and a cancel button 1802 for canceling are also placed.

Figure 19:
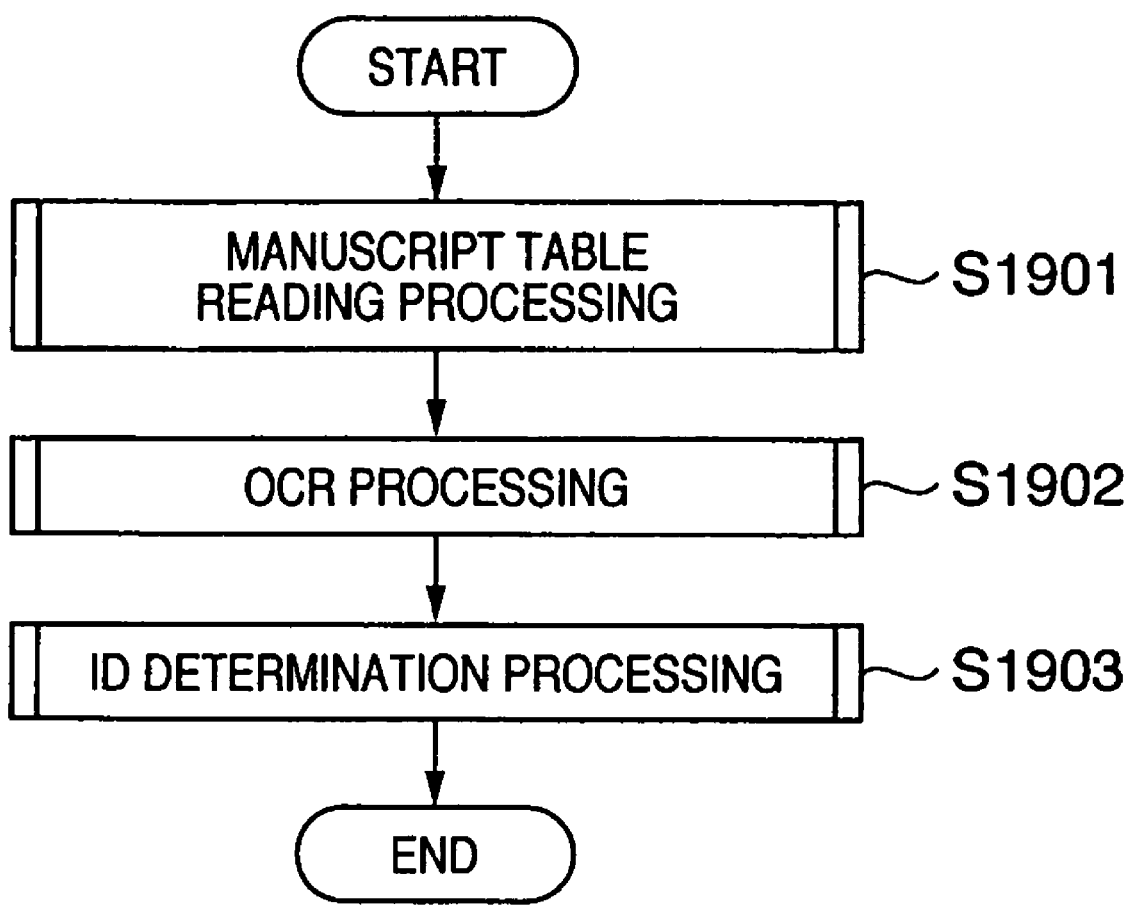
FIG. 19 is a flowchart showing device identifying information reading processing in a fourth embodiment.

FIG. 19 is a flowchart showing device identifying information reading processing in the fourth embodiment. First, at the step S1901, a still image of a plurality of devices placed on a manuscript table is read by manuscript reading processing. Next, at the step S1902, a device information character string included in the still image is analyzed by OCR processing. Then, at the step S1903, the device ID is determined by ID determination processing and the processing ends.

Although device identifying information is analyzed by using the OCR processing in the fourth embodiment, the other analyzing methods using a still image such as a barcode or a two-dimensional barcode, a digital watermark or the like can be used.

Figure 20:
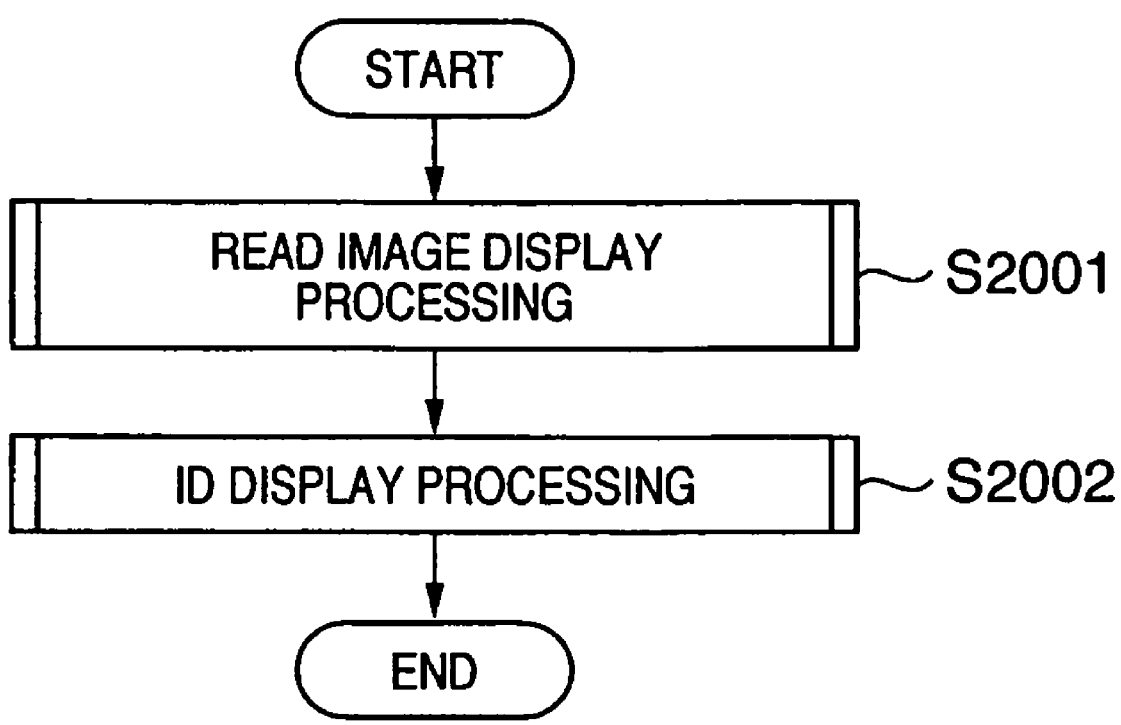
FIG. 20 is a flowchart showing device list display processing in the fourth embodiment.

FIG. 20 is a flowchart showing device list display processing in the fourth embodiment. First, at the step S2001, still images of a plurality of devices placed on a manuscript table are displayed by read image display processing. Next, at the step S2002, device IDs are displayed over a place corresponding to the still images by ID display processing, and the processing ends.

Although only devices included in the read in still images are listed in the fourth embodiment, another device such as an arbitration device can also be displayed at the same time.

Figure 21:
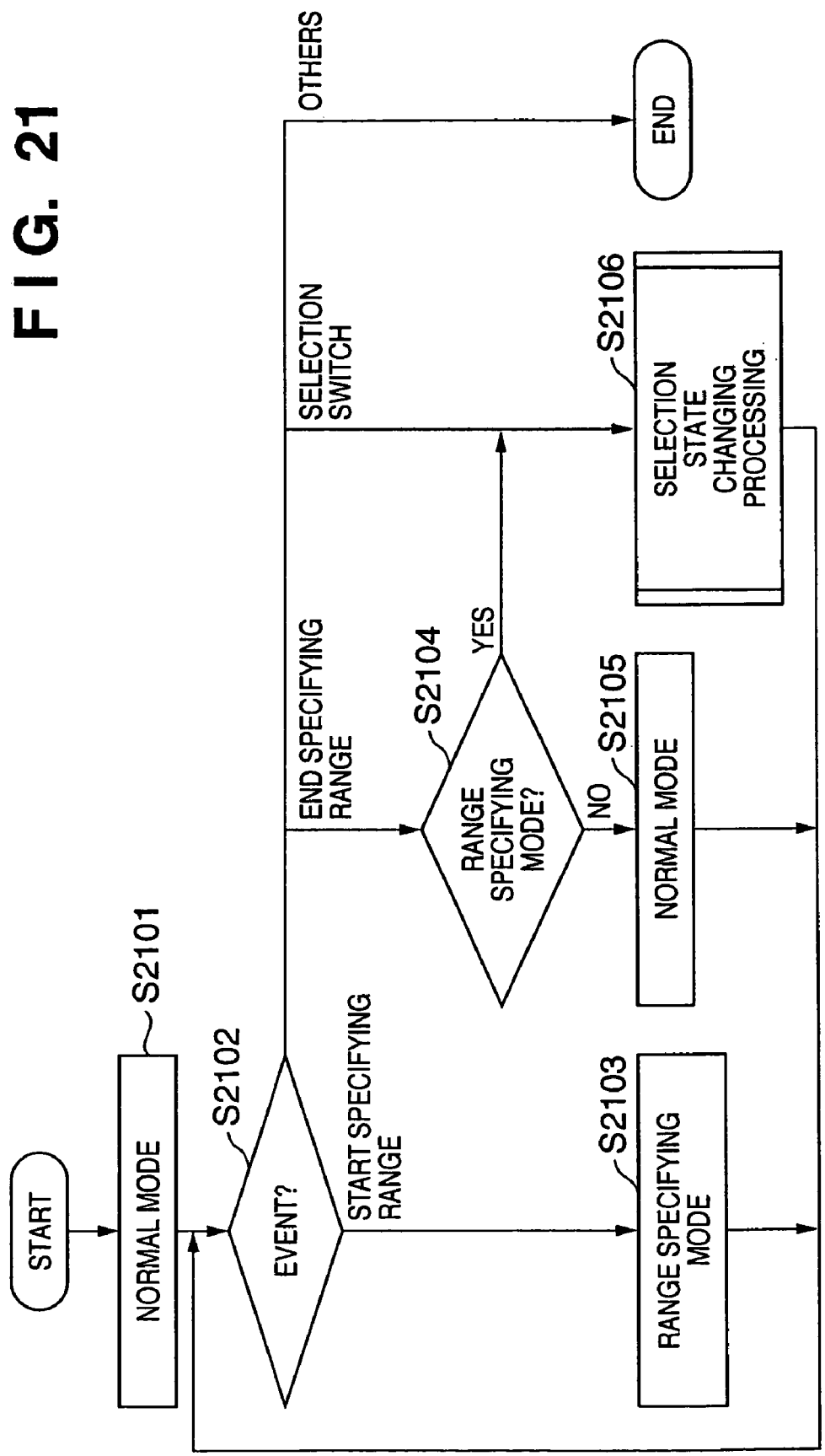
FIG. 21 is a flowchart showing grouping designation processing in the fourth embodiment.

FIG. 21 is a flowchart showing grouping designation processing in the fourth embodiment. First, at the step S2101, it is changed into a normal mode, and the processing after the step S2102 is repeated. If it is determined that the designation is a range specification starting operation at the step S2102, the operation proceeds to the step S2103, and it is changed into a range specifying mode, and the operation returns to the step S2102, and the abovementioned processing is repeated. If it is determined that the designation is range specification ending operation at the step S2102, the operation proceeds to the step S2104, and whether it is the range specifying mode or not is determined. If it is not the range specifying mode, the operation proceeds to the step S2105 and changes it to a normal mode, and the operation returns to the step S2102, and the abovementioned processing is repeated.

If it is determined as the range designating mode at the step S2104, or if it is determined as switching operation of an explicit selection state at the step S2102, the operation proceeds to the step S2106. At the step S2106, a selection state is changed by selection state changing processing, and the operation returns to the step S2102 and the abovementioned processing is repeated. If it is determined as operation other than those mentioned above at the step S2102, the processing ends.

As such, according to the fourth embodiment, more intuitive and secured operation can be realized, when a device desired to be grouped is actually treated and the result is checked on a list display which is the same as their actual arrangements and shapes.

Fifth Embodiment

Next, by using FIG. 22 and FIG. 32, a fifth embodiment according to the present invention will be described in detail. The fifth embodiment will be described by taking an example of the case where data or identifying information is synchronized within a group.

Figure 22:
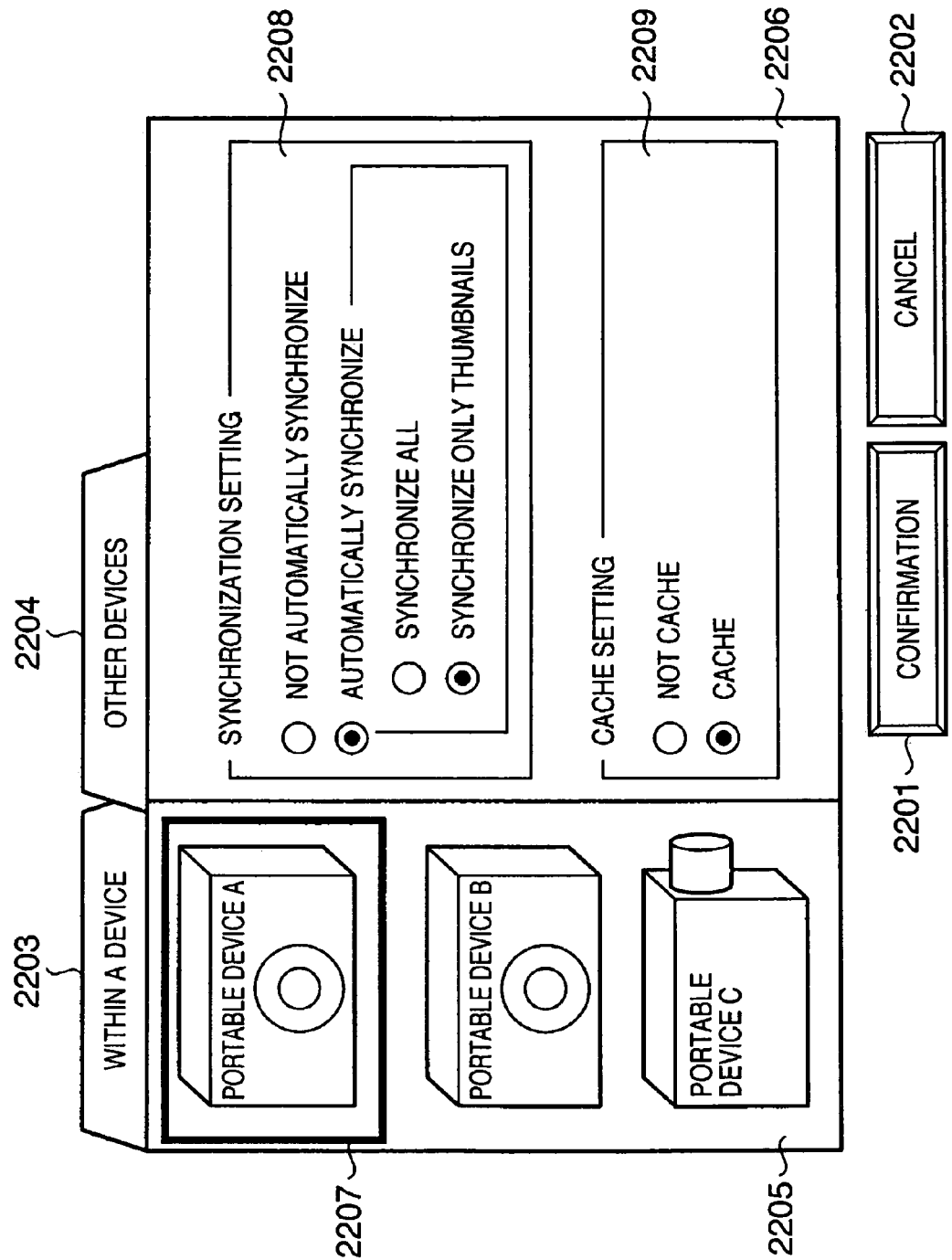
FIG. 22 is a diagram showing an example of a synchronization specifying operation screen displayed on the operation screen of the arbitration device.

FIG. 22 is a diagram showing an example of the synchronization specifying operation screen displayed on the operation screen of the arbitration device. The example in FIG. 22 shows that the other devices tab is active among a within a device tab 2203 and the other devices tab 2204 for switching operation objects. It also shows that another device selecting region 2205 and a synchronization specifying region 2206 are displayed in the operation screen and the portable device A is selected as the reference numeral 2207.

The abovementioned synchronization specifying region 2206 consists of a synchronization setting region 2208 and a cache setting region 2209. In this example, it is specifically shown that "automatically synchronize" and "synchronize only thumbnail" are set for synchronization to the portable device A and that "cache" is set to a cache setting. A confirmation button 1801 for confirming the settings and a cancel button 1802 for canceling are also placed.

Figure 23:
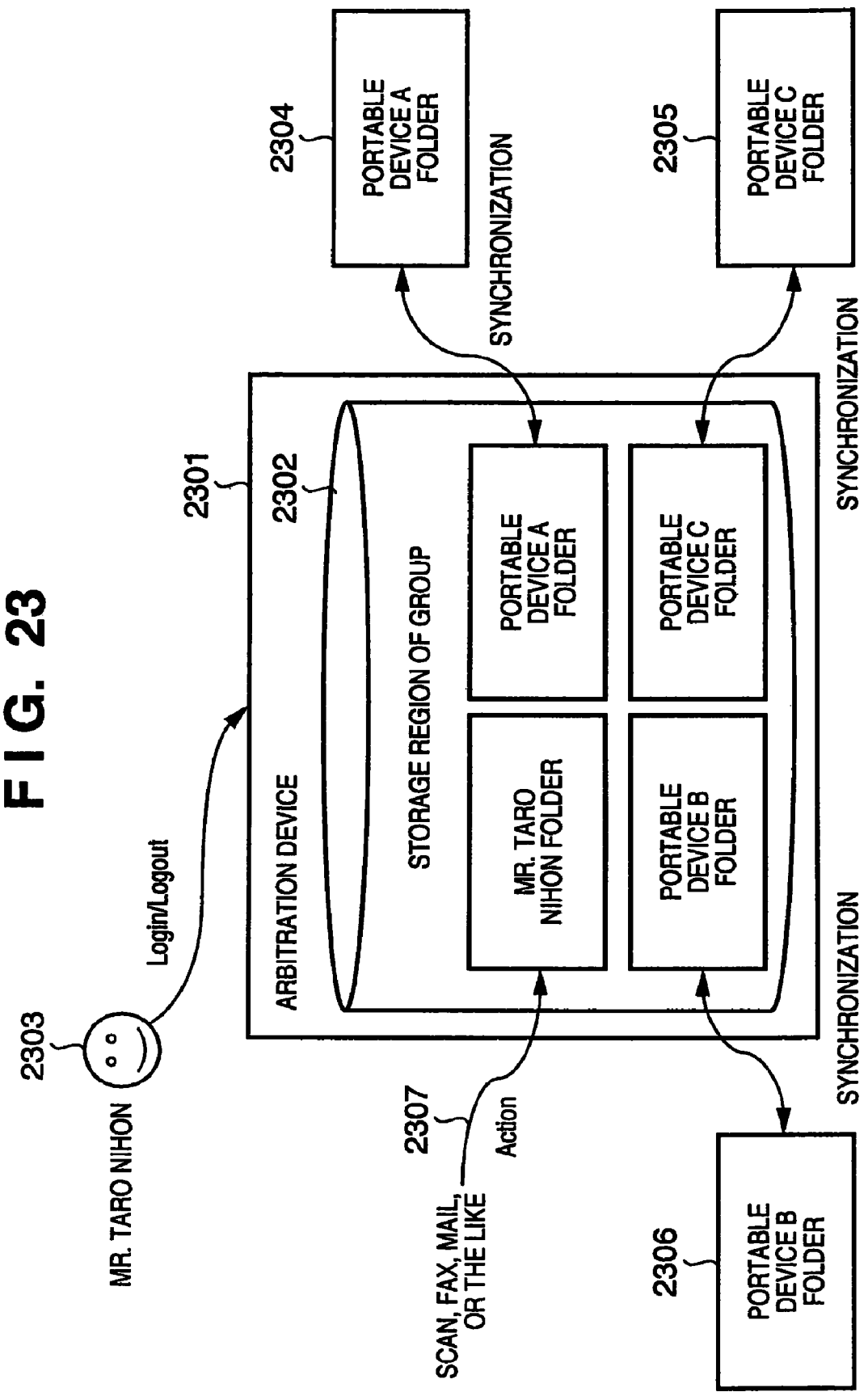
FIG. 23 is a diagram showing an example of an arbitration device image in a fifth embodiment.

FIG. 23 is a diagram showing an example of an arbitration device image in the fifth embodiment. As shown in FIG. 23, the arbitration device 2301 enables not only direct operation by a user 2303 but also operation from a plurality of other devices 2304-2306 connected via a wired/wireless network. At the same time, it also enables actions 2307 including scanning, facsimile and mail by a single arbitration device 2301.

Like the abovementioned embodiments, the fifth embodiment also enables the arbitration device 2301 to login by a user "Mr. Taro Nihon", for example, and the portable devices A, B, and C and the arbitration device to be grouped. As a result of being set to be synchronized between each portable device and the arbitration device, a storage region of the groups 2302 is reserved in the arbitration device and folders for synchronization corresponding to respective portable devices are generated.

With such a configuration, data within a folder is synchronized between an arbitration device and a portable device, and each portable device can indirectly access data in another portable device by referencing the folder for another portable device in the arbitration device.

Figure 24:
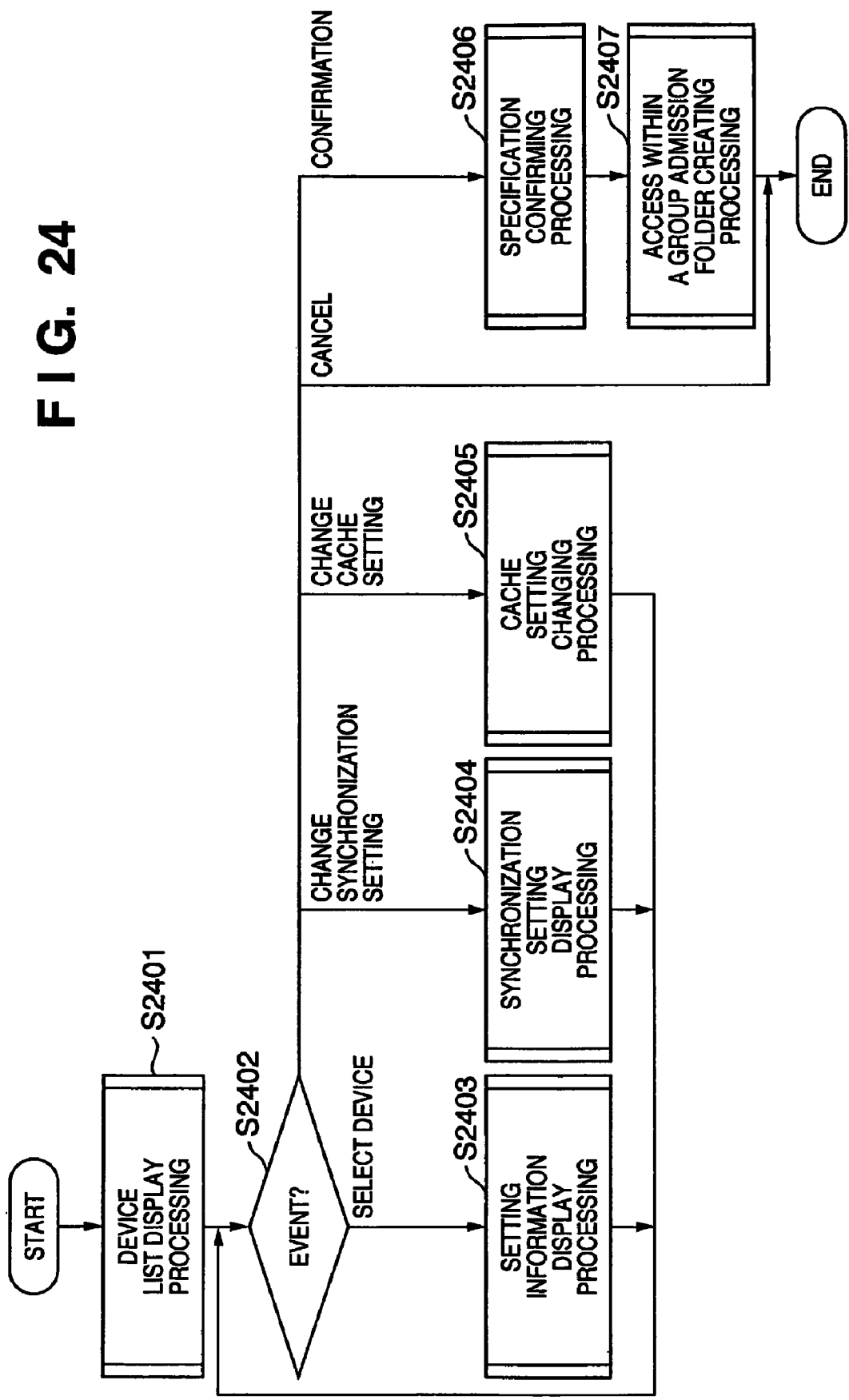
FIG. 24 is a flowchart showing a synchronization specifying processing in the fifth embodiment.

FIG. 24 is a flowchart showing synchronization specifying processing in the fifth embodiment. First at the step S2401, components in a group are listed by device list display processing, and the processing after the step S2402 is repeated. If device selecting operation is performed at the step S2402, the operation proceeds to the step S2403 and synchronization setting information corresponding to the device selected by setting information display processing is displayed, and the operation returns to the step S2402, and the abovementioned processing is repeated. If the synchronization setting changing operation is performed at the step S2402, the operation proceeds to the step S2404, and a synchronization setting is changed by the synchronization setting changing processing, and the operation returns to the step S2402, and the abovementioned processing is repeated.

If a cache setting changing operation is performed at the step S2402, the operation proceeds to the step S2405, and a cache setting is changed by the cache setting changing processing, and the operation returns to the step S2402, and the abovementioned processing is repeated. If confirmation operation is performed at the step S2402, the operation proceeds to the step S2406, and the setting details till then are confirmed by the designation confirming processing. Then, at the step S2407, a folder for within a group access is created in the arbitration device by access within a group admission folder creating processing, and the processing ends. On the other hand, if canceling operation is performed at the step S2402, the processing ends.

Figure 25:
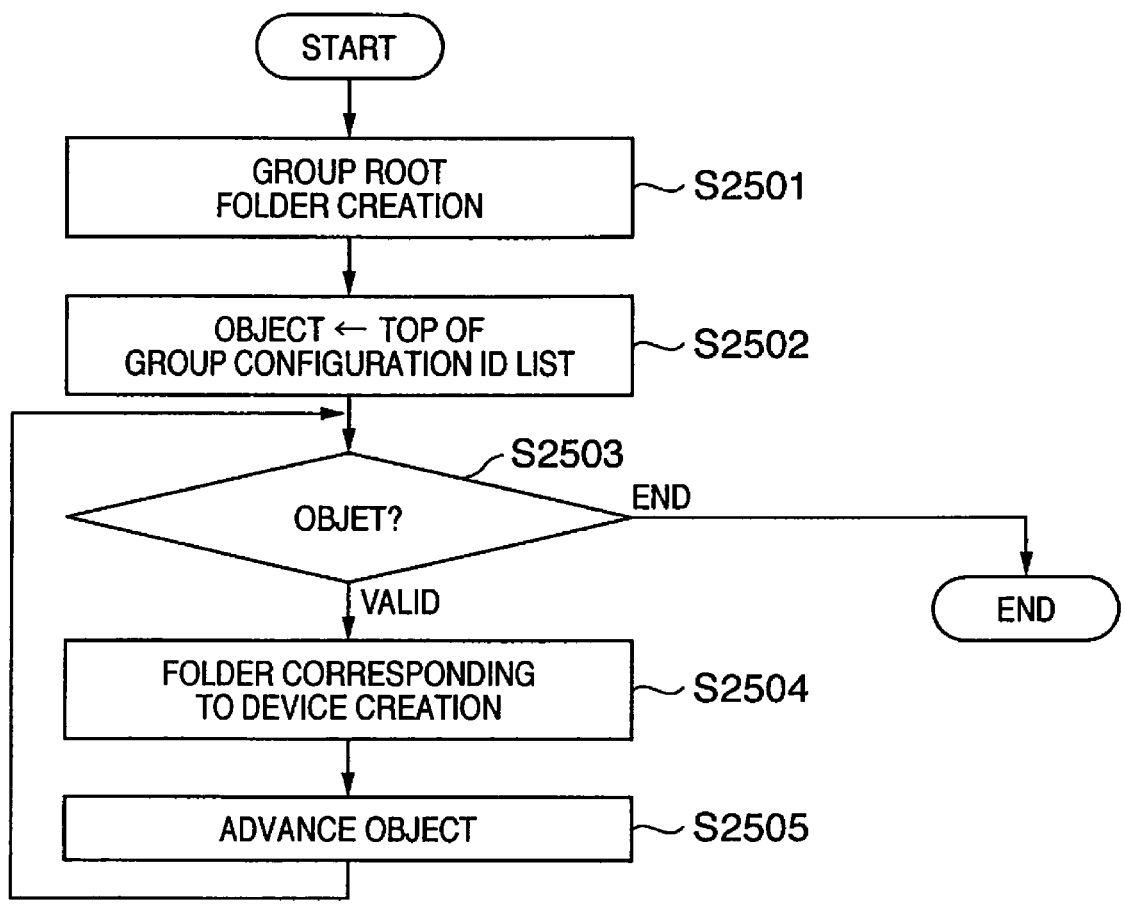
FIG. 25 is a flowchart showing an access within a group admission folder creating operation in the fifth embodiment.

FIG. 25 is a flowchart showing access within a group admission folder creating processing in the fifth embodiment. First, at the step S2501, a root folder for access within a group is created. Next, at the step S2502, the top of a group configuration ID list is initialized as an object, and the processing after the step S2503 is repeated. If the object is valid at the step S2503, the operation proceeds to the step S2504, and a folder corresponding to a device is created immediately under the root folder. Then, at the step S2505, the object is advanced, and the operation returns to the step S2503, and the abovementioned processing is repeated. On the other hand, if the object is not valid at the step S2503, it is determined as an end and the processing ends.

FIG. 26 is a diagram showing an example of synchronization management data created by the synchronization specifying operation screen. In the synchronization management data shown in FIG. 26, a relative Path for a root folder for access within a group, a configuration ID of the corresponding device, the presence of synchronization specification, specification of an object of synchronization, and the presence of cache designation are recorded. For example, the synchronization management data 2601 corresponds to a component of ID=102 with Path="A", and specification of synchronization and specification of cache are performed for a thumbnails as an object, and corresponds to settings shown in FIG. 22.

Figure 27:
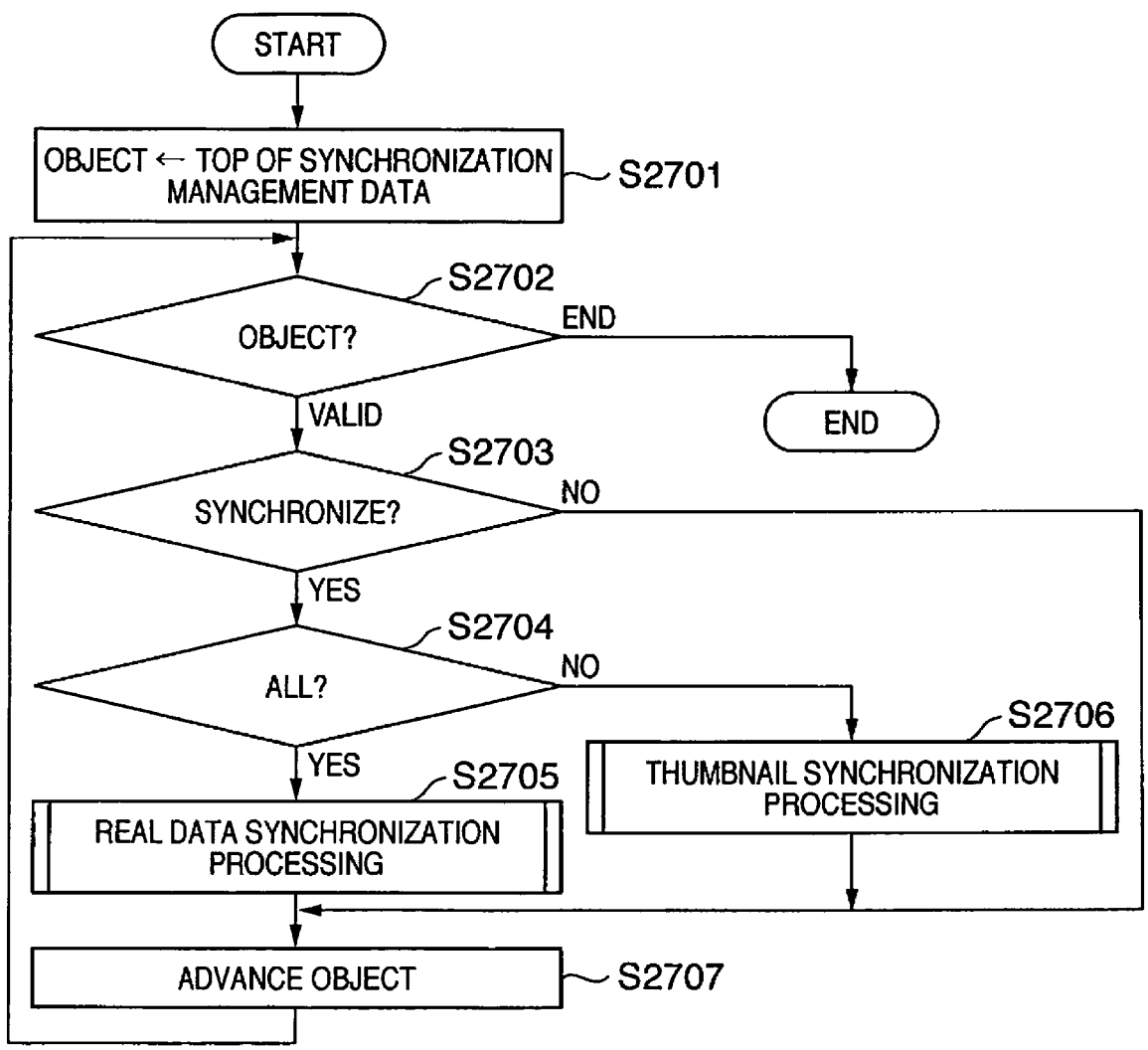
FIG. 27 is a flowchart showing data synchronization processing in the fifth embodiment.

FIG. 27 is a flowchart showing data synchronization processing in the fifth embodiment. First, at the step S2701, the top of the synchronization management data is initialized as an object, and the processing after the step S2702 is repeated. If the object is valid at the step S2702, the operation proceeds to the step S2703, and whether synchronization is specified or not is determined. If synchronization is not designated at the step S2703, the operation proceeds to the step S2707 and the object is advanced, and the operation returns to the step S2702 and the abovementioned processing is repeated. If synchronization is specified at the step S2703, the operation proceeds to the step S2704, and whether the synchronization objects are all or not is determined. If the synchronization objects are all, the operation proceeds to the step S2705, and data is synchronized by the real data synchronization processing. If the synchronization objects are not all at the step S2704, the operation proceeds to the step S2706, and only the thumbnails are synchronized by the thumbnail synchronization processing. When the abovementioned processing at the step S2705 or the step S2706 ends, the objects are advanced at the step S2707, and the operation returns to the step S2702 and the abovementioned processing is repeated. On the other hand, if the object is not valid at the step S2702, it is determined as an end, and the processing ends.

Figure 28:
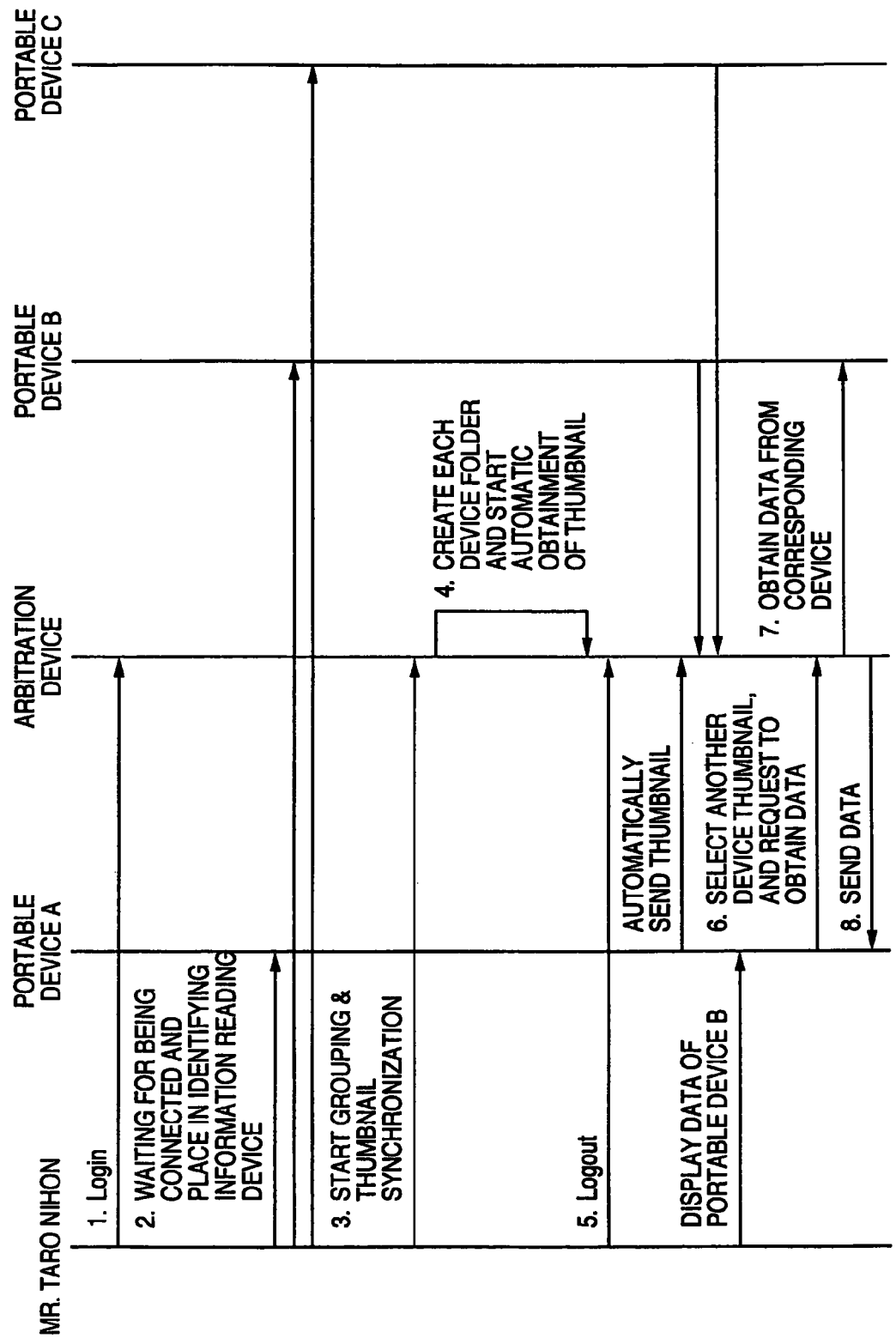
FIG. 28 is a diagram showing an example of a sequence of obtaining data within a group in the fifth embodiment.

FIG. 28 is a diagram showing an example of a sequence for obtaining data within a group in the fifth embodiment. Like the first embodiment (FIG. 10), it shows processing among devices that form the system and a flow of data in response to data obtaining operation that is designated by the operation screen. In FIG. 28, it consists of two phases of grouping and synchronization specifying operation of a plurality of portable devices and data access operation of the other devices within a group. First, in the phase of grouping and synchronization specifying operation, "1. Login by performing authenticating operation on the arbitration device" is executed by operation of "Mr. Taro Nihon", a user, by using an arbitration device and a plurality of portable devices. Next, after "2. Place in the identifying information reading device by performing authenticating operation of each portable device" is executed, "3. Grouping and thumbnail synchronization starting operation" is executed. As a result, "4. A folder corresponding to each appliance is created and thumbnail automatic obtaining start" is executed and "5. Logout" is done, and synchronization of thumbnails continues thereafter.

Next, in the data access operation phase, "6. Thumbnails of the other devices are selected and data is requested to be obtained" by the operation by "Mr. Taro Nihon" performed on the portable device A. As a result, the result of "7. Data is obtained from the corresponding device", and "8. Send data" is displayed. Grouping of a plurality of devices and viewing data of the other devices in a group is realized by the flow above.

FIG. 29 is a diagram showing an example of data identifying information management data for managing correlation between data identifying information and the original data to be used in accessing data of the other devices. In the fifth embodiment, as a thumbnail is used as data identifying information, data identifying information management data records the other devices configuration IDs and data IDs which stores a thumbnail Path for identifying a thumbnail and corresponding original data. For example, it is shown that data identifying information management data 2901 is associated with original data of data ID=IMG_0021.jpg within another device of a configuration ID=102, which corresponds to a thumbnail Path="A¥IMG_0021.thm".

Figure 30:
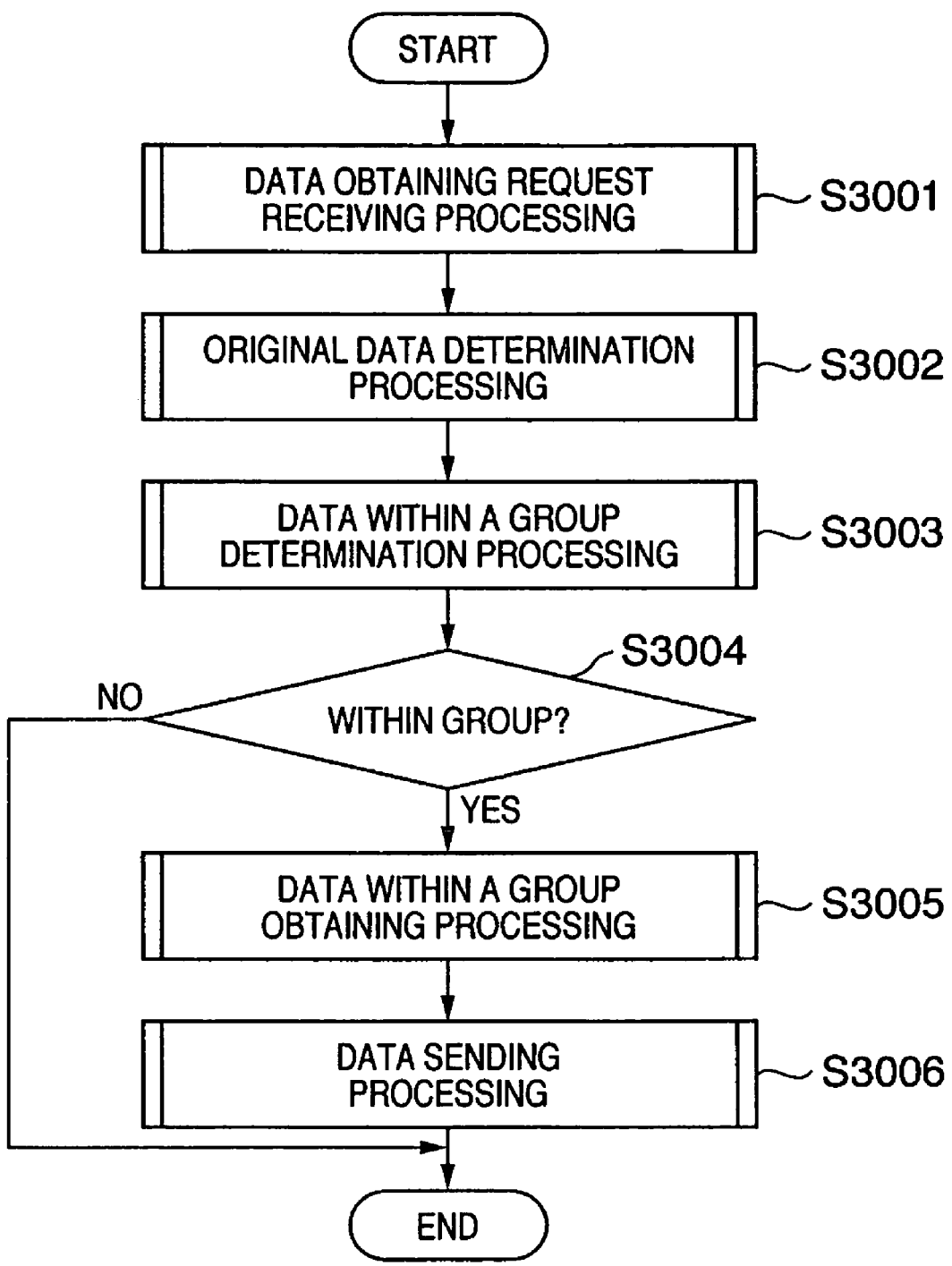
FIG. 30 is a flowchart showing data obtaining proxy processing in the fifth embodiment.

FIG. 30 is a flowchart showing data obtaining proxy processing in the fifth embodiment. First, at the step S3001, a request to obtain data sent from another device by data obtaining request receiving processing is received. Next at the step S3002, corresponding original data is determined by referencing data identifying information management data by original data determination processing. Then, at the step S3003, whether both of the requesting device and the requested device are in the same group or not is determined by data within a group determination processing. Then, if it is determined to be within the same group at the step S3004, the operation proceeds to the step S3004, and data is obtained from the requested another device by data within a group obtaining processing. Next, at the step S3006, data is sent to the requesting device by data sending processing and the processing ends.

FIG. 31 is a diagram showing an example of temporally saved data which temporally records data previously obtained via the arbitration device in the fifth embodiment. As shown in FIG. 31, in the temporally saved data, a configuration ID of another device which saves data, a data ID for identifying data, updated date and time for determining whether the temporally saved data and the original data are the same or not, and information on size are recorded. For example, it is shown that in temporally saved data 3101, data of a data ID="IMG_0021.jpg" of another device of a configuration ID=102 is saved, and updated date and time of the temporally saved data and the size are recorded.

Although updated date and time and size are used for determining identity, other updating management mechanism such as a checksum, an updating counter and the like may be used.

Figure 32:
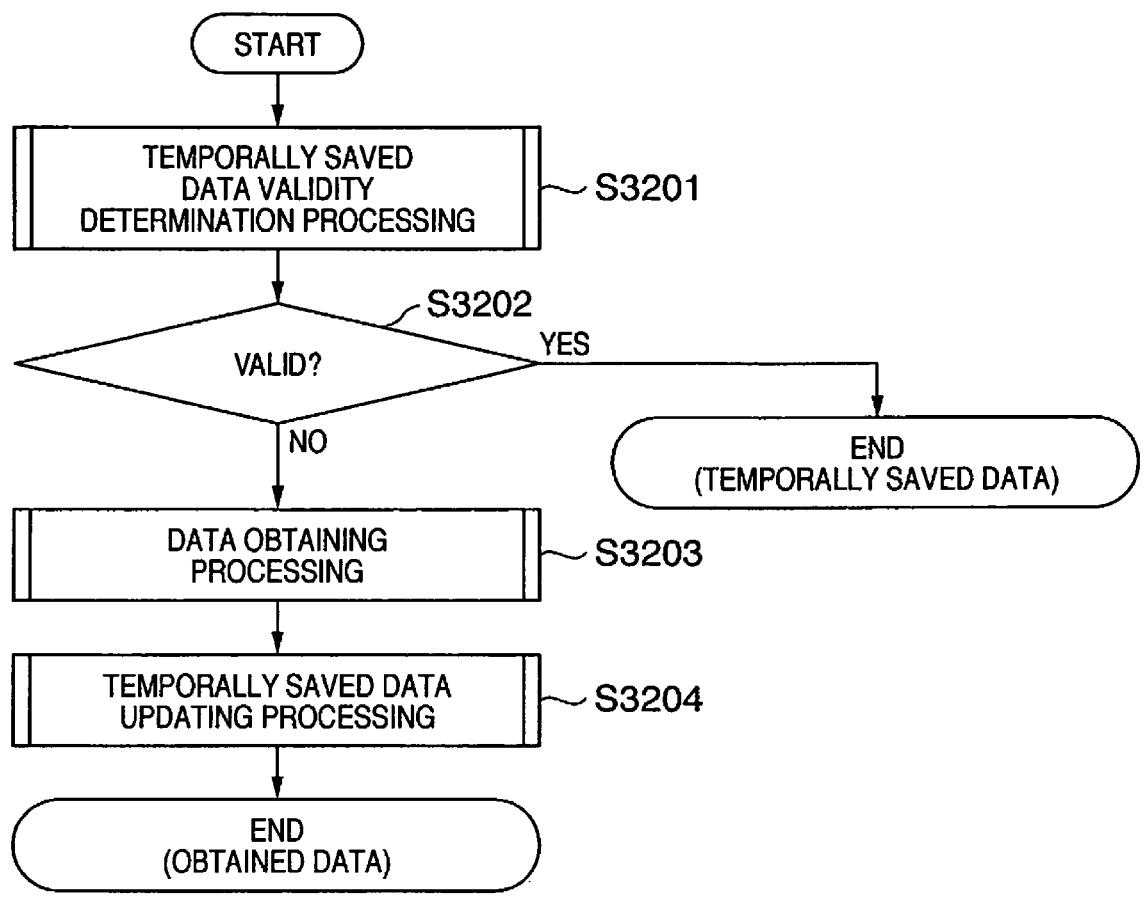
FIG. 32 is a flowchart showing data within a group obtaining processing in the fifth embodiment.

FIG. 32 is a flowchart showing a data within a group obtaining processing in the fifth embodiment. First, at the step S3201, whether data to be obtained is saved in the temporally saved data or not, or whether the saved data is the same as the original data or not is determined by the temporally saved data validity determination processing. Next, if the temporally saved data is valid at the step S3202, data in temporally saved data is obtained and the processing ends. On the other hand, if it is not valid at the step S3202, the operation proceeds to the step S3203, and data is obtained from the requested another device by data obtaining processing. Then, at the step S3204, temporally saved data is updated with data obtained by temporally saved data updating processing and the processing ends.

As such, according to the fifth embodiment, effects below are obtained.

(1) Data can be automatically synchronized within a group.

(2) Object of synchronization may be viewed intuitively and comprehensibly.

(3) Load of communication and appliance necessary for synchronization can be alleviated and actually needed data exchange can be focused on.

(4) A synchronization method can be specified according to a user's object.

(5) The amount of data access can be cut and load of communication and appliance can be alleviated.

Sixth Embodiment

Next, by using FIG. 33 to FIG. 35, a sixth embodiment according to the present invention will be described in detail. The sixth embodiment will be described by taking an example of the case where synchronization details are specified from another device.

Figure 33:
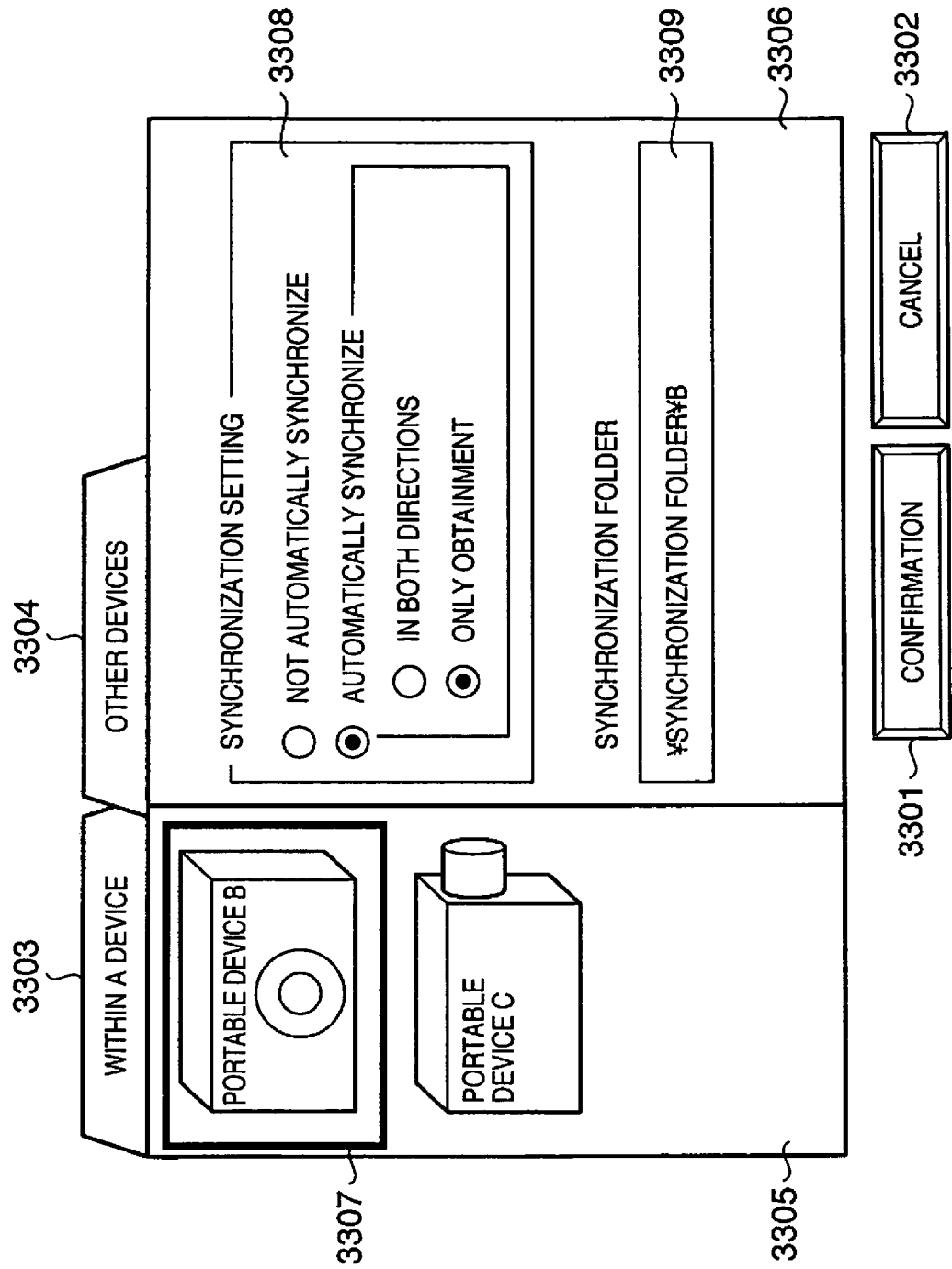
FIG. 33 is a diagram showing an example of a synchronization specifying operation screen displayed on an operation screen of a portable device.

FIG. 33 is a diagram showing an example of the synchronization specifying operation screen displayed on an operation screen of a portable device. In the example shown in FIG. 33, it is shown that other devices tab 3304 is active among a within a device tab 3303 for switching operation objects and other devices tab 3304. It is shown that the another device selecting region 3305 and the synchronization specifying region 3306 are displayed on the operation screen, and the portable device B is selected as the reference numeral 3307.

The abovementioned synchronization specifying region 3306 consists of a synchronization setting region 3308 and the synchronization folder specifying region 3309. In this example, it specifically shows that "automatically synchronize" and "synchronize only obtainment" are set to synchronization for the portable device B and that "¥synchronization folder¥B" in the self device is set as a synchronization folder. A confirmation button 3301 for confirming the settings and a cancel button 3302 for canceling are also placed.

FIG. 34 is a diagram showing an example of synchronization management data in the portable device B. Here, in the synchronization management data, an absolute Path for specifying a synchronization object folder in the device, a configuration ID of a corresponding device, the presence of synchronization specification, and the specification of the synchronization direction are recorded. For example, synchronization management data 3401 is specified for synchronization only in the obtaining direction corresponding to the component of an ID=105 with a Path="¥synchronization folder¥B", and corresponds to the settings shown in FIG. 33.

Figure 35:
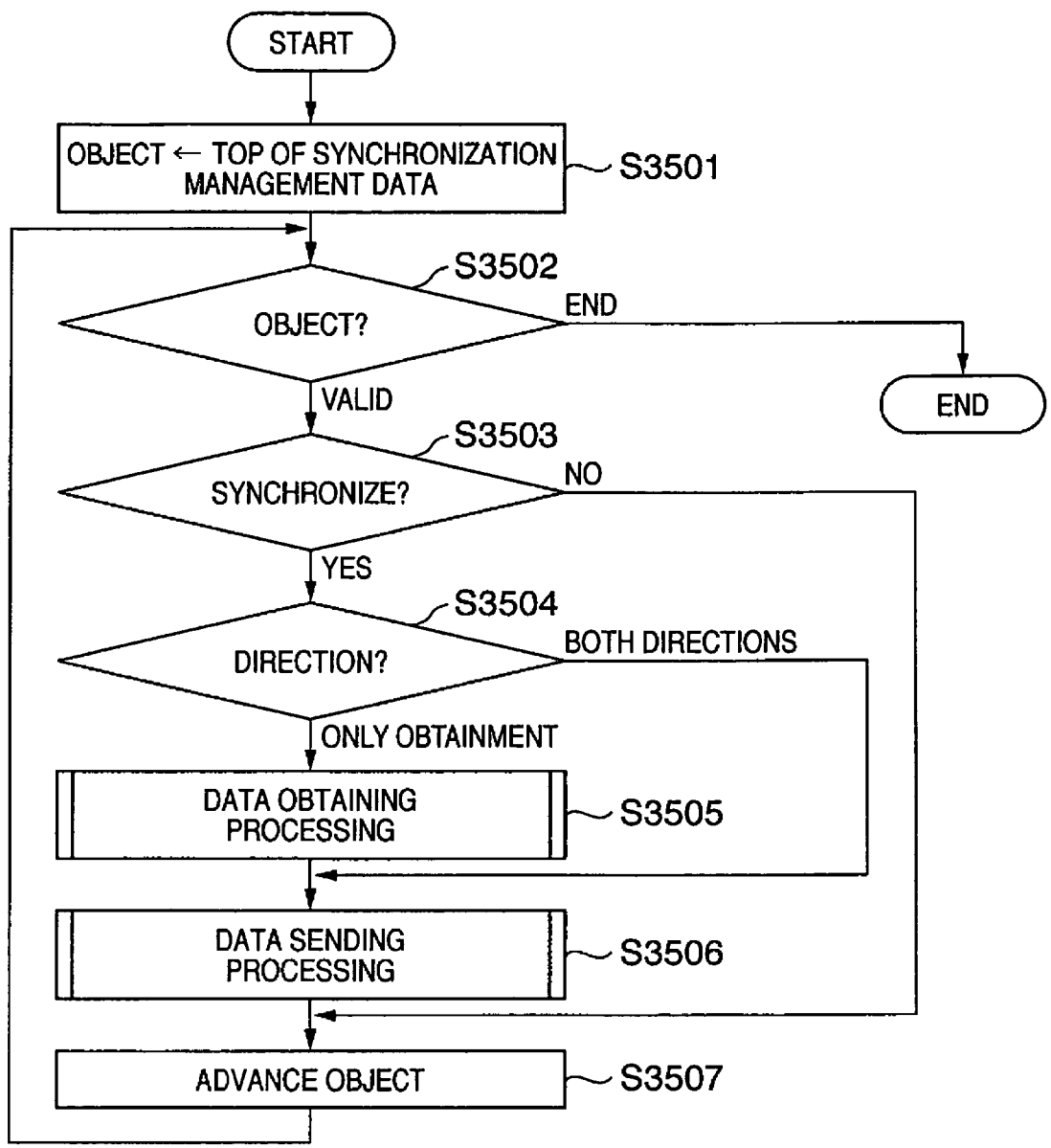
FIG. 35 is a flowchart showing data synchronization processing in a sixth embodiment.

FIG. 35 is a flowchart showing data synchronization processing in a sixth embodiment. First, at the step S3501, the top of the synchronization management data is initialized as an object, and the processing after the step S3502 is repeated. If the object is valid at the step S3502, whether synchronization is specified or not is determined at the step S3503. If synchronization is not specified, the operation proceeds to the step S3507, and the object is advanced, and the operation returns to the step S3502, and the abovementioned processing is repeated. If synchronization is specified at the step S3503, the operation proceeds to the step S3504, and the synchronization direction is determined. If the synchronization direction is only obtainment, the operation proceeds to the step S3505 and data is obtained from the synchronization object by data obtaining processing.

On the other hand, if it is both directions at the step S3504, the operation proceeds to the step S3506, and data is sent to the synchronization object by data sending processing and the object is advanced at the step S3507. The operation returns to the step S3502, and the abovementioned processing is repeat On the other hand, if the object is not valid at the step S3502, it is determined as an end and the processing ends.

As such, according to the sixth embodiment, synchronization specification can also be performed from another device side.

Seventh Embodiment

Next, by using FIG. 36 to FIG. 39, a seventh embodiment according to the present invention will be described in detail. The seventh embodiment will be described by taking an example of the case where grouping is admitted or not.

Figure 36:
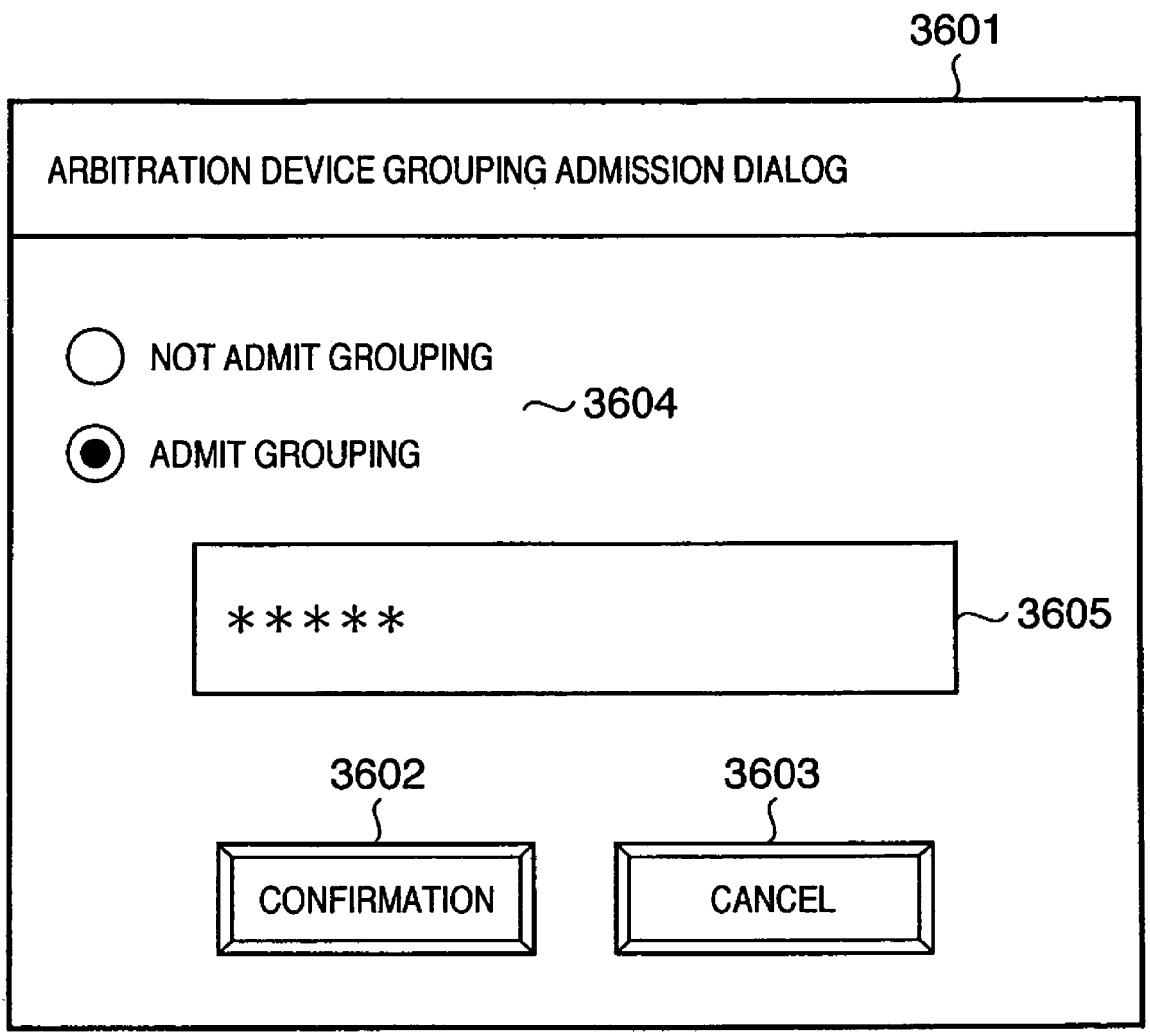
FIG. 36 is a diagram showing an example of an arbitration device grouping admission screen displayed on an operation device.

FIG. 36 is a diagram showing an example of an arbitration device grouping admission screen displayed on the operation screen. In the example shown in FIG. 36, designation to select between admit or not admit grouping 3604, and a password input region necessary to be admitted 3605 are indicated in an arbitration device grouping admission dialog 3601. A confirmation button 3602 for confirming the operation and a cancel button 3603 for canceling are also placed.

FIG. 37 is a diagram showing an example of a portable device A grouping admission screen displayed on the operation screen of a portable device. In the portable device A grouping admission dialog 3701, designation to select between admit or not admit grouping 3704, and a password input region 3705 necessary in admission are indicated. A confirmation button 3702 for confirming the operation and a cancel button 3703 for canceling are also placed.

With such a configuration, whether grouping is admitted or not can be controlled at each device side.

Figure 38:
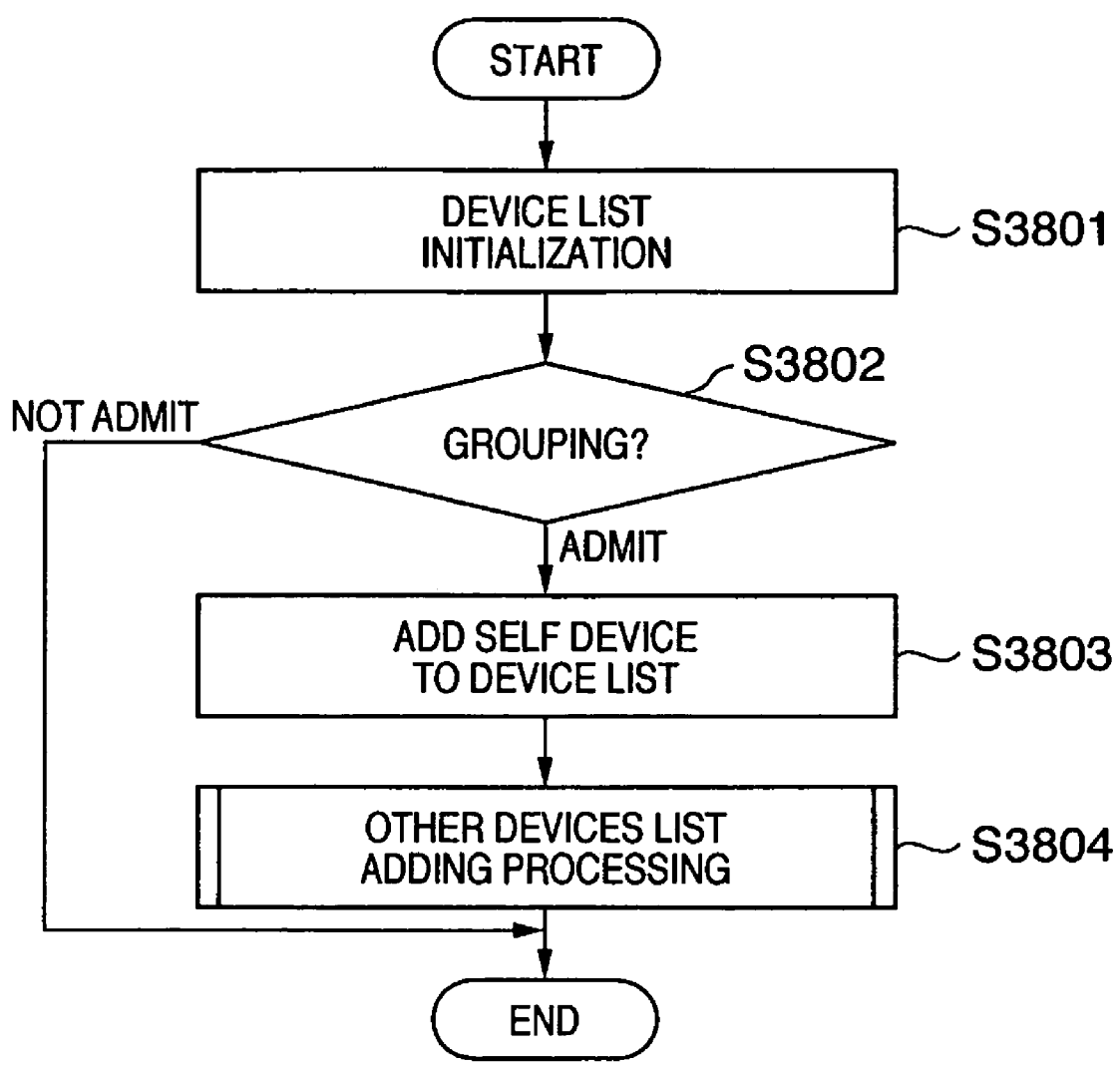
FIG. 38 is a flowchart showing device list displaying processing in a seventh embodiment.

FIG. 38 is a flowchart showing the device list display processing in a seventh embodiment. First, at the step S3801, a device list display is initialized, and at the step S3802, whether grouping is admitted or not is determined by operation using arbitration device grouping admission screen. As a result, if grouping is admitted, the operation proceeds to the step S3803, and the arbitration device is added to the device list. Next, at the step S3804, another device is added by the other devices list adding processing and the processing ends.

Figure 39:
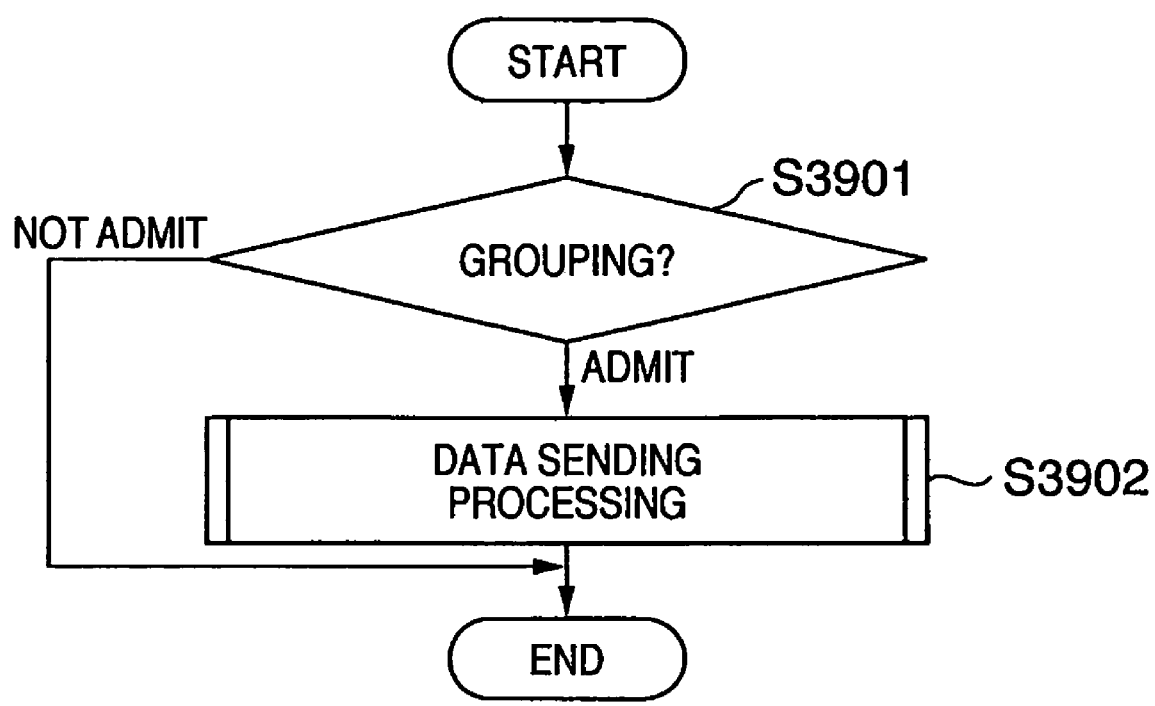
FIG. 39 is a flowchart showing data obtaining request responding processing at a portable device side in the seventh embodiment.

FIG. 39 is a flowchart showing data obtaining request responding processing at the portable device side in the seventh embodiment. First, at the step S3901, whether grouping is admitted or not is determined by operation by using the portable device A grouping admission screen. As a result, only in the case where grouping is admitted, data requested by data sending processing is sent at the step S3902, and the processing ends.

As such, according to the seventh embodiment, the other device which is not admitted to be grouped can be avoided to be grouped. The self device which is not admitted to be grouped can also be avoided to be grouped.

The present invention may be applied to a system consisting of a plurality of appliances (for example, a host computer, an interface appliance, a reader, a printer and the like) or may be applied to a device consisting of a single appliance (for example, a copying machine, a facsimile device or the like).

A recording medium that records software program codes for realizing functions of the abovementioned embodiments is supplied to a system or a device, whose computer (a CPU or an MPU) reads and executes the program codes stored in the recording medium. It is needless to say that the objects of the present invention can be achieved by that.

In such a case, program codes read out from the recording medium realizes functions of the abovementioned embodiments, and the recording medium storing the program codes forms the present invention.

Examples of non-transitory computer-readable storage media for supplying the computer-executable program codes, include a floppy disk, a hard disk, an optical disk, a magnetic optical disk, CD-ROM, CD-R, a magnetic tape, a non-volatile memory card, ROM.

It is needless to say that not only functions of the abovementioned embodiments are realized when program codes read out by a computer are executed, but also the cases below are included. That is to say, the case where an OS (operating system) or the like running on a computer executes a part or all the actual processing, based on designation of the program codes, and the functions of the abovementioned embodiments are realized by the processing.

Further, the program codes read out from the recording medium write in a function extension board inserted in a computer or a memory included in a functional extension unit connected to a computer. Then, it is needless to say that the functional extension board or a CPU or the like included in a function extension unit executes a part or all of the actual processing, based on designation of the program codes, and the processing realizes the functions of the abovementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-240198, filed Aug. 22, 2005, which is hereby incorporated by reference herein in its entirety.

What is claimed is:

1. An information processing apparatus that identifies, groups, and manages communication devices, the apparatus comprising:

a reading unit that reads identifying information, which identifies a plurality of communication devices, wherein none of the plurality of communication devices is permitted to access any other of the plurality of communication devices directly;
a grouping unit that groups and manages the plurality of communication devices
a receiving unit that receives, from a first communication device, a request to obtain data of a second communication device that has been grouped by the grouping unit;
a determination unit that determines whether the grouping unit has grouped the first communication device and the second communication device in a same group;
an obtaining unit that obtains data of the second communication device, if the determination unit determines that the first communication device and the second communication device are in the same group; and
a sending unit that sends the obtained data to the first communication device, if the determination unit determines that the first communication device and the second communication device are in the same group,
wherein at least one of the receiving unit and the determination unit is incorporated in a processor that is coupled to a memory, and
wherein the grouping unit determines whether grouping of each of the plurality of communication devices is permitted, and, if a communication device is not permitted to be grouped, the grouping unit does not group that communication device.

2. The apparatus according to claim 1, wherein the grouping unit comprises:
a listing unit that lists the communication devices identified by the identifying information; and
a designating unit that designates one or more of the plurality of communication devices to be grouped from a displayed list.

3. The apparatus according to claim 2, wherein the reading unit reads respective pieces of the identifying information of the plurality of communication devices.

4. The apparatus according to claim 2, wherein the reading unit includes any one or a combination of a non-contact identification tag reading unit, a Universal Serial Bus connecting unit, an infrared communication unit, a short-range wireless unit, a barcode reading unit, and a capture unit.

5. The apparatus according to claim 2, wherein the displayed list displays one or more images of one or more of the plurality of communication devices, and
the designating unit designates the one or more of the plurality of communication devices to be grouped using the one or more images.

6. The apparatus according to claim 1, further comprising:
a creating unit for creating a folder, wherein a group of the plurality of communication devices is permitted to access the folder; and
a synchronizing unit that automatically synchronizes the folder and data in one of the plurality of communication devices.

7. The apparatus according to claim 6, further comprising:
a corresponding folder creating unit that creates one or more corresponding folders, wherein each of the corresponding folders corresponds to a different one of the group of the plurality of communication devices permitted to access the folder,
wherein the synchronizing unit synchronizes each of the corresponding folders with a corresponding communication device of the group of the plurality of communication devices.

8. The apparatus according to claim 6, wherein the synchronizing unit synchronizes data identifying information for identifying data and the receiving unit receives the data identifying information.

9. The apparatus according to claim 6, further comprising:
a synchronization object folder specifying unit that specifies a synchronization object folder; and
a synchronization details specifying unit that specifies synchronization details;
wherein the synchronizing unit synchronizes according to the specified synchronization details.

10. The apparatus according to claim 1, wherein the obtaining unit saves the obtained data and determines whether the obtained data is within one of the plurality of communication devices, and, if the obtained data is determined to be within one of the plurality of communication devices, the obtaining unit uses the obtained data.

11. The apparatus according to claim 1, wherein the grouping unit determines whether the apparatus is permitted to be grouped, and, if the apparatus is not permitted to be grouped, the grouping unit does not group the apparatus.

12. A grouping method performed by an information processing apparatus that identifies, groups, and manages communication devices, the method comprising:
reading identifying information, which identifies a plurality of communication devices, wherein none of the plurality of communication devices is permitted to access any other of the plurality of communication devices directly;
receiving, from a first communication device, a request to obtain data of a second communication device that has been grouped;
determining whether the first communication device and the second communication device have been grouped in a same group;
obtaining data of the second communication device, if the first communication device and the second communication device are determined to have been grouped in the same group; and
sending the obtained data to the first communication device, if the first communication device and the second communication device are determined to have been grouped in the same group,
wherein the grouping includes determining whether grouping of each of the plurality of communication devices is permitted, and, if a communication device is not permitted to be grouped, the grouping does not group that communication device.

13. A non-transitory computer-readable storage medium storing computer-executable codes that, when executed by a computer, cause the computer to perform a method of identifying, grouping, and managing communication devices, the method comprising:
reading identifying information, which identifies a plurality of communication devices, wherein none of the plurality of communication devices is permitted to access any other of the plurality of communication devices directly;
grouping and managing the plurality of communication devices;
receiving, from a first communication device, a request to obtain data of a second communication device that has been grouped;
determining whether the first communication device and the second communication device have been grouped in a same group;

obtaining data of the second communication device, if the first communication device and the second communication device are determined to have been grouped in the same group; and sending the obtained data to the first communication device, if the first communication device and the second communication device are determined to have been grouped in the same group, wherein the grouping includes determining whether grouping of each of the plurality of communication devices is permitted, and, if a communication device is not permitted to be grouped, the grouping does not group that communication device.

* * * * *